United States Patent
Alkhabbaz

(10) Patent No.: US 11,561,122 B2
(45) Date of Patent: Jan. 24, 2023

(54) TANK GAUGING AND INVENTORY MANAGEMENT SYSTEM

(71) Applicant: Saudi Arabian Oil Company, Dhahran (SA)

(72) Inventor: Fouad M. Alkhabbaz, Qatif (SA)

(73) Assignee: Saudi Arabian Oil Company, Dhahran (SA)

(*) Notice: Subject to any disclaimer, the term of this patent is extended or adjusted under 35 U.S.C. 154(b) by 196 days.

(21) Appl. No.: 16/928,813

(22) Filed: Jul. 14, 2020

(65) Prior Publication Data

US 2020/0340848 A1    Oct. 29, 2020

Related U.S. Application Data

(63) Continuation-in-part of application No. 15/621,167, filed on Jun. 13, 2017, now Pat. No. 10,746,866.

(51) Int. Cl.
B65D 90/48    (2006.01)
G01F 23/68    (2006.01)

(52) U.S. Cl.
CPC .......... G01F 23/686 (2013.01); B65D 90/48 (2013.01)

(58) Field of Classification Search
CPC ............ B65D 2203/04; B65D 2203/10; B65D 90/48; G01F 23/686
See application file for complete search history.

(56) References Cited

U.S. PATENT DOCUMENTS

| 4,965,996 A | 9/1990 | Morris |
| 5,291,031 A * | 3/1994 | MacDonald ............ G01F 23/68 250/577 |
| 8,195,590 B1 | 6/2012 | Coggins et al. |
| 8,271,212 B2 | 9/2012 | Sai et al. |
| 8,359,171 B2 | 1/2013 | Bleys et al. |
| 2002/0156556 A1* | 10/2002 | Ruffner ................. A01D 42/00 318/587 |

(Continued)

FOREIGN PATENT DOCUMENTS

| CN | 102520388 | 6/2012 |
| DE | 102015204675 | 9/2016 |

(Continued)

OTHER PUBLICATIONS

PCT International Search Report and Written Opinion in International Application No. PCT/US2021/041525, dated Nov. 2, 2021, 13 pages.

(Continued)

*Primary Examiner* — Timothy A Brainard
(74) *Attorney, Agent, or Firm* — Fish & Richardson P.C.

(57) ABSTRACT

The disclosure generally describes computer-implemented methods, software, and systems for gauging tanks. A computer-implemented method includes generating, using an interrogator, a radio frequency signal directed towards a radio frequency identification (RFID) device that is freely floating on the liquid stored within the tank, receiving a return signal from the RFID device, the return signal being associated to a location of the RFID device, processing the return signal to determine a height of the liquid stored within the tank based on a triangulation algorithm, and determining a result data based on the height of the liquid stored within the tank and one or more tank characteristics.

18 Claims, 10 Drawing Sheets

(56) References Cited

U.S. PATENT DOCUMENTS

| | | | |
|---|---|---|---|
| 2005/0168379 A1* | 8/2005 | Griessbaum | G01S 13/88 342/124 |
| 2006/0032547 A1 | 2/2006 | Rossi | |
| 2007/0028684 A1* | 2/2007 | Benz | G01F 23/64 73/314 |
| 2008/0061984 A1 | 3/2008 | Breed et al. | |
| 2009/0174570 A1* | 7/2009 | Hagg | G08C 17/02 340/870.31 |
| 2009/0224930 A1 | 9/2009 | Burza | |
| 2010/0231410 A1 | 9/2010 | Seisenberger | |
| 2011/0074551 A1 | 3/2011 | Higashionji et al. | |
| 2011/0181426 A1 | 7/2011 | Bucciero et al. | |
| 2013/0002443 A1* | 1/2013 | Breed | B65D 90/48 340/686.1 |
| 2013/0162405 A1 | 6/2013 | Forster | |
| 2014/0150549 A1 | 6/2014 | Rieger et al. | |
| 2016/0206136 A1 | 7/2016 | Storek | |
| 2018/0356512 A1 | 12/2018 | Alkhabbaz | |

FOREIGN PATENT DOCUMENTS

| | | | |
|---|---|---|---|
| EP | 1832548 | 12/2007 | |
| EP | 2396273 | 12/2011 | |
| JP | 2014119266 | 6/2014 | |
| WO | 2009000283 | 12/2008 | |
| WO | WO-2009000283 A1 * | 12/2008 | G01F 23/284 |
| WO | WO 2013070131 | 5/2013 | |
| WO | 2016073267 | 5/2016 | |

OTHER PUBLICATIONS

Canaz, "Planar and Linear Feature-Based Registration of Terrestrial Laser Scans with Minimum Overlap Using Photogrammetric Data," Masters Thesis, University of Calgary, Dec. 2012, 142 pages.

Gokce et al., "Vision-Based Detection and Distance Estimation of Micro Unmanned Aerial Vehicles," Sensors, 2015, 15:23805-23846, 42 pages.

Petrie et al., "Introduction to Laser Ranging, Profiling, and Scanning," Topographic Laser Ranging and Scanning: Principles and Processing, 2008, 29 pages.

Petrie et al., "Terrestrial Laser Scanners," Topographic Laser Ranging and Scanning: Principles and Processing, 2009, 43 pages.

Pyimagesearch.com [online], Rosebrock, "Find distance from camera to object/marker using Python and OpenCV," Jan. 2015, retrieved on Oct. 21, 2020, retrieved from URL <https://www.pyimagesearch.com/2015/01/19/find-distance-camera-objectmarker-using-python-opencv/>, 109 pages.

GCC Gulf Cooperation Council Examination Report in GCC Appln. No. GC 2018-35482, dated Apr. 20, 2020, 3 pages.

PCT International Search Report and Written Opinion issued in International Application No. PCT/US2018/036860 dated Oct. 2, 2018, 13 pages.

GCC Examination Report in GCC Appln. No. GC 2018-35482, dated May 9, 2021, 3 pages.

\* cited by examiner

TANK GAUGING AND INVENTORY MANAGEMENT SYSTEM

CROSS REFERENCE TO RELATED APPLICATIONS

This application is a Continuation-in-Part of U.S. patent application Ser. No. 15/621,167, filed Jun. 13, 2017, entitled "RFID Triangulated Tank Gauging and Inventory Management System and Apparatus," the entire contents of which are incorporated herein by reference.

BACKGROUND

Data telemetry applications based on radio-frequency identification (RFID) can be used for remote calculation transmission of liquid amounts stored within storage tanks in refineries or storage tank farms. A typical sensing system includes a level gauge float or similar sensor connected to a gaugehead. The sensor drives the gaugehead, and the gaugehead provides a local visual indication of the level of liquid in the storage tank. A level encoder-transmitter unit can be mechanically coupled to the gaugehead to translate the mechanical movement of the float sensor and gaugehead assembly to a positional-encoded electrical signal and to transmit the signal to a remote collection or control system. Some float sensors use risers and guiding rails to ensure the float remains in the center of the storage tank (or "tank"). However, risers or guiding rails can induce false readings and can be an undesirable limitation for large storage tanks.

SUMMARY

The present disclosure describes a RFID triangulated tank gauging method to locally store data, and to transmit data to a tank farm inventory management system. The transmitted data can be used by plant control systems for actuation of inlet and outlet valves and the engagement of tank overflow protection, if so needed. The tank gauging method uses a position information of a RFID float apparatus, which is floating on a surface of a fluid in a tank, to gauge a level of the fluid in the tank. The present disclosure also describes methods that are based on positioning or distance estimation for determining fluid level in a tank.

In an implementation, a computer-implemented method includes: generating, using an interrogator, a radio frequency signal, the interrogator being attached to a top of a tank that is configured to store a liquid and the radio frequency signal being directed towards a radio frequency identification (RFID) device that is freely floating on the liquid stored within the tank, receiving a return signal from the RFID device, the return signal being associated to a location of the RFID device, processing, by one or more processors integrated in the interrogator, the return signal to determine a height of the liquid stored within the storage tank based on a triangulation algorithm, and determining, by the one or more processors, a result data based on the height of the liquid stored within the storage tank and one or more tank characteristics.

In another implementation, a non-transitory, computer-readable medium stores one or more instructions executable by a computer system to perform operations including: generating, using an interrogator, a radio frequency signal, the interrogator being attached to a top of a tank that is configured to store a liquid and the radio frequency signal being directed towards a radio frequency identification (RFID) device that is freely floating on the liquid stored within the tank, receiving a return signal from the RFID device, the return signal being associated to a location of the RFID device, processing, by one or more processors integrated in the interrogator, the return signal to determine a height of the liquid stored within the storage tank based on a triangulation algorithm, and determining, by the one or more processors, a result data based on the height of the liquid stored within the storage tank and one or more tank characteristics. In another implementation, a computer-implemented system includes: a tank configured to store a liquid, a radio frequency identification (RFID) device freely floating on the liquid stored within the storage tank, an interrogator attached to a top of the storage tank, the interrogator including a computer memory and a hardware processor interoperably coupled with the computer memory and configured to perform operations including: generating a radio frequency signal directed towards the RFID device, receiving a return signal from the RFID device, the return signal being associated to a location of the RFID device, processing the return signal to determine a height of the liquid stored within the storage tank based on a triangulation algorithm, and determining a result data based on the height of the liquid stored within the storage tank and one or more tank characteristics.

The foregoing and other implementations can each, optionally, include one or more of the following features, alone or in combination. In particular, one implementation can include all the following features:

In a first aspect, combinable with any general implementation, the result data is transmitted to an inventory management system. In a second aspect, combinable with any of the previous aspects, the radio frequency signal is generated in response to receiving a trigger signal. In a third aspect, combinable with any of the previous aspects, the return signal includes a beam length and an angle associated to the RFID device. In a fourth aspect, combinable with any of the previous aspects, the result data includes an amount of the liquid stored within the tank. A fifth aspect, combinable with any of the previous aspects includes, in response to determining the result data, opening a valve attached to the tank to modify the amount of the liquid stored within the tank. In a sixth aspect, combinable with any of the previous aspects, the RFID device includes a camera configured to take images of an inner wall of the tank. In a seventh aspect, combinable with any of the previous aspects, processing the return signal includes performing an image processing algorithm of the images of the inner wall of the tank. In an eight aspect, combinable with any of the previous aspects, the RFID device includes a propulsion system configured to move the RFID device between different positions.

Another aspect of the subject matter described in this specification may be embodied in a method that include the actions of: measuring, using one or more devices of a float apparatus, a property of at least one signal in a storage tank that stores a liquid, where the float apparatus is freely floating on the liquid in the storage tank; calculating, based on the property of the at least one signal, a position of the float apparatus within the storage tank; and transmitting data indicative of the position to an interrogator device attached to the storage tank, where the interrogator device is configured to use the position of the float apparatus to determine a current fluid level in the storage tank.

The previously-described implementation is applicable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium. These and other embodiments may each optionally include one or more of the following features.

In an implementation, the one or more devices include a plurality of optical sensors, where the at least one signal includes an optical signal reflected by or emitted from an optical target within the storage tank, where the property of the at least one signal is a strength of the at least one signal, and where the position of the float apparatus within the storage tank includes a vertical distance between the float apparatus and a top area of the storage tank.

In an implementation, the float apparatus further includes a light source that illuminates the optical target, and where the optical signal is a reflection of an illumination from the light source.

In an implementation, the optical target includes a light source that emits the optical signal.

In an implementation, the float apparatus further includes a light source that emits an intensity modulated light toward a reflective target within the storage tank, where the at least one signal includes an optical signal reflected from the reflective target, where the one or more devices include an optical sensor, where the property of the at least one signal is a difference in phase between the intensity modulated light and the optical signal, and where the position of the float apparatus within the storage tank includes a distance between the float apparatus and the reflective target.

In an implementation, the one or more devices include a vibration sensor, where the at least one signal includes a vibration signal, and where the property of the at least one signal is a frequency of the vibration signal.

In an implementation, a source of the vibration signal is at least one of a standalone vibration source in the storage tank or a propulsion engine of the float apparatus.

In an implementation, the one or more devices include a wireless charging receiver, where the at least one signal is a wireless power signal, and where the property of the at least one signal is a power transfer efficiency.

In an implementation, the float apparatus uses the float positioning information as to program custom propulsion plans for activities such as, routine structure inspection and to commence wireless charging.

In an implementation, the information provided by the float apparatus can be used to enable digital transformation processes by facilitating dashboarding, advanced data analytics, and artificial intelligence capabilities. In this implementation, the one or more devices further gather data indicative of digital transformation information, wherein the digital transformation information is used for prediction and decision making in proactive control schemes.

In an implementation, the float apparatus further includes an image sensor configured to capture an image of a target within the storage tank, and where the method further includes calculating, based on the captured image, a distance between the image sensor and the target.

In an implementation, calculating, based on the image, the distance between the image sensor and the target uses the equation:

$$f = \frac{(p \times d)}{w},$$

where f is a focal length of the image sensor, p is an apparent width in pixels, and d is a distance between the image sensor and the target.

The subject matter described in this specification can be implemented in particular implementations, so as to realize one or more of the following advantages.

Currently-available tank gauging systems require mechanical risers and guiding rails to ensure that the float is in the center of the storage tank. The use of mechanical moving parts, such as mechanical risers and guiding rails may induce false readings due to their tendency to get stuck due to friction caused by misalignment which could cause tank overflow. However, the described RFID devices can be configured to float freely within the storage tank, which simplifies implementation of the system to tanks with different heights and configurations. The RFID devices can contain a wirelessly rechargeable battery and an internal memory which can be used to store auxiliary information, such as tank management information or maintenance records. The auxiliary information, including, for example, schedules of planned maintenance activities, manpower, spare parts, process control and instrumentations figures, or procurement data, can be retrieved regardless of the uptime status of a plant control system. In some instances, the auxiliary information can be used in an embedded Disaster Recovery Plan (DRP).

In some implementations, the system can include a plurality of RFID devices to maximize level calculation accuracy and expand memory storage capacity to carry the auxiliary data. Each RFID device can be used in the detection of an amount of liquid within the storage tank and, optionally, one or more characteristics of the storage tank or the liquid within the storage tank. As a result, a system including a plurality of RFID devices can permit a larger storage capacity and calculate the amount of liquid within the storage tank and the additional characteristics with higher accuracy. The RFID devices can contain active RFID transmitter, memory, wireless-type rechargeable battery, antenna, LED flash light, camera, and a wireless-HART gateway. The information from one tank can be combined with the information received from the rest of tank systems in a tank farm, by a total plant management (TPM) system, also known as a tank farm inventory management system. The TPM is configured to provide a corporate level capacity planning, including multiple potential suppliers and customers.

A TPM system (module) can be configured to maintain a local tank farm management information "database" and also to communicate over network (wired or wireless) with remote devices. The TPM system supports multiprotocol stacks of commercial and industrial protocols (for example, MODBUS, HART, and OPC). The industrial protocol support can integrate the TPM system into plant control systems, enabling plant control systems to receive commands and process alerts/alarms back to the Distributed Control Systems (DCS) or supervisory control and data acquisition (SCADA). The TPM module supports various encryption methods to ensure data integrity and privacy and is configured to process two types of information: 1) maintenance records (for example, schedule and plan maintenance activities, manpower, spare parts, or procurement) and 2) a tank inventory system. The TPM module can be configured to manage: a) process control (for example, if a storage tank is empty, run a filling pump or, if full, open a relief valve) and b) business control (for example, capacity planning, customer allocation, and coordination).

The TPM can communicate with a tank interrogator using a unique network address. The unique network address provides the ability to direct specific network traffic to a specific interrogator at a time (unicast) or send a global request for information (broadcast).

When an RFID device is fitted with an industrial grade camera with IR capability, and can be used to detect cracks, corrosion or debris. The TPM can be configured with Network Timing Protocol (NTP) to synchronize time for all RFID float devices. In some implementations, a propulsion method (for example, a propeller) can be used to navigate the RFID device to obtain closer look at a particular area of the tank. The camera can compare newly-taken images to stored images for a storage tank in a known, working state. Determined discrepancies can be identified and reported for analysis.

In some implementations, the system can support proactive alerting if certain thresholds are met, such as overdue tank maintenance period, overflow indication, low level indication, and time to fill up a tank. When interfaced with email, a whitelisted email of addresses can be created with additional multi-factor authentication measures (for example, using mobile SMS messages). In some implementations, a request for inventory management information can be remotely requested (for example, using email or mobile SMS messages). In response to a remote request, the TPM module can respond with a report, which can help a user make management decisions. The email-based request message can be restricted to preselected functionalities and can prevent other commands that are not within an approved request list. The tank management software can be configured to allow logical grouping of tanks per configurable criteria such as: type of fluid, tank size, or tank age. The logical grouping helps ease the management and operation of the tank farm, and assists in producing specific area reporting and data analysis.

In some implementations, the system can be used as wireless-HART gateway supporting wireless communication with one or more wireless sensors (for example, temperature or pressure sensors) to perform inside-tank process operations. The float device can be used to house the wireless-HART gateway sharing the battery and antenna apparatus with the RFID token. The wireless-HART gateway can interface with the RFID for the process of locally storing some process values if so needed. When connected to inlet-outlet valve and overflow control system, it can work as a Leak Detection System (LDS) by correlating tank fluid level to inlet-outlet fluid capacity movements over preset time intervals. Because the float RFID memory can contain historic tank information, leak magnitude (severity) can be determined and forecasted (predicted) over a longer period of time.

In some implementations, the system can support 802.1x authentication and multifactor authentication. The supported authentication methods helps to integrate user credentials as part of corporate systems (such as, MS Active Directory, RADIUS, or TACACS).

In some implementations, the system can include a number of provided self-protection measures, including hardware-based whitelisting. In hardware-based whitelisting, each hardware component (for example, CPU, memory, and network interface) is assigned a hardware digital ID by which any communication in or out of the component must be signed with and verified against. This measure can protect the system against any unauthorized tampering with or manipulation of hardware components.

Similarly, software whitelisting can be used to include self-protection measures. Software whitelisting can ensure that each software component, such as operating systems (OS), applications plugins, or network drivers are digitally identified and verified. This measure can protect the system against unauthorized tampering with or manipulation of software components.

Another self-protection measure can be configured to protect against tampering with TPM module by installing a protective "seal" on the casing. The seal can be electronically guided and operated so that if broken (for example, when the TPM module case is opened), an electronic "flag" can be sent to a hardware whitelisting subroutine. The seal logic and mechanism can be powered by an internal battery to ensure continuous operation even if the device is unplugged from wall power.

Another self-protection measure can be a built-in, anomaly-based, intrusion detection system. The system can be designed to detect system intrusion by monitoring system activity and categorizing it as either normal or abnormal. The system can employ a neural network that learns and stores patterns of acceptable system behavior so that the system can proactively cut network traffic upon detection of suspicious behavior.

Another self-protection measure can include a built-in on-off switch that controls enabling or disabling remote access and configuration of the device using SSH and HTTPS. The built-in on-off switch can provide protection for the device once it has been fully configured. In "off" position, the device can be configured not to accept any network based requests for management.

Another aspect of enhancing system availability and reliability can include a dual bus architecture. The dual bus architecture encompasses dual a CPU and dual memory, or two independent devices working as a single device using built in-synchronizing circuitry. System efficiency can be enhanced by using data buffering and compression. The system can also include a self-restoration subroutine so that in the event a configuration is lost or damaged, it can easily be restored from a backup point on a "flash" memory or from a network storage location.

The TPM system can be configured to withstand adverse weather conditions. For example, the system can include a housing, constructed to be weather proof and vandal proof, that enables the installation of the system outdoors or in relatively hostile environment. The housing can include a material that can provide system protection in severe corrosive environments, such as stainless steel NEMA Type 4X or IEC 60529 Type IP66. The system can include one or more features for sturdy mounting to avoid potential vibration. The system mount can be designed to support the maximum weight of system and enclosure assemblies. The system can include a grounding terminal. The system can be configured to be continuously available and reliable by including an embedded uninterrupted power supply (UPS) on both the TPM and interrogator apparatus. The power supply can be configured to enable the system to operate for at least 60 minutes in the event of power loss, to provide the ability to extract important data and critical reports in power outage situations. Other advantages will be apparent to those of ordinary skill in the art.

The details of one or more implementations of the subject matter of this specification are set forth in the accompanying drawings and the description. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1A:
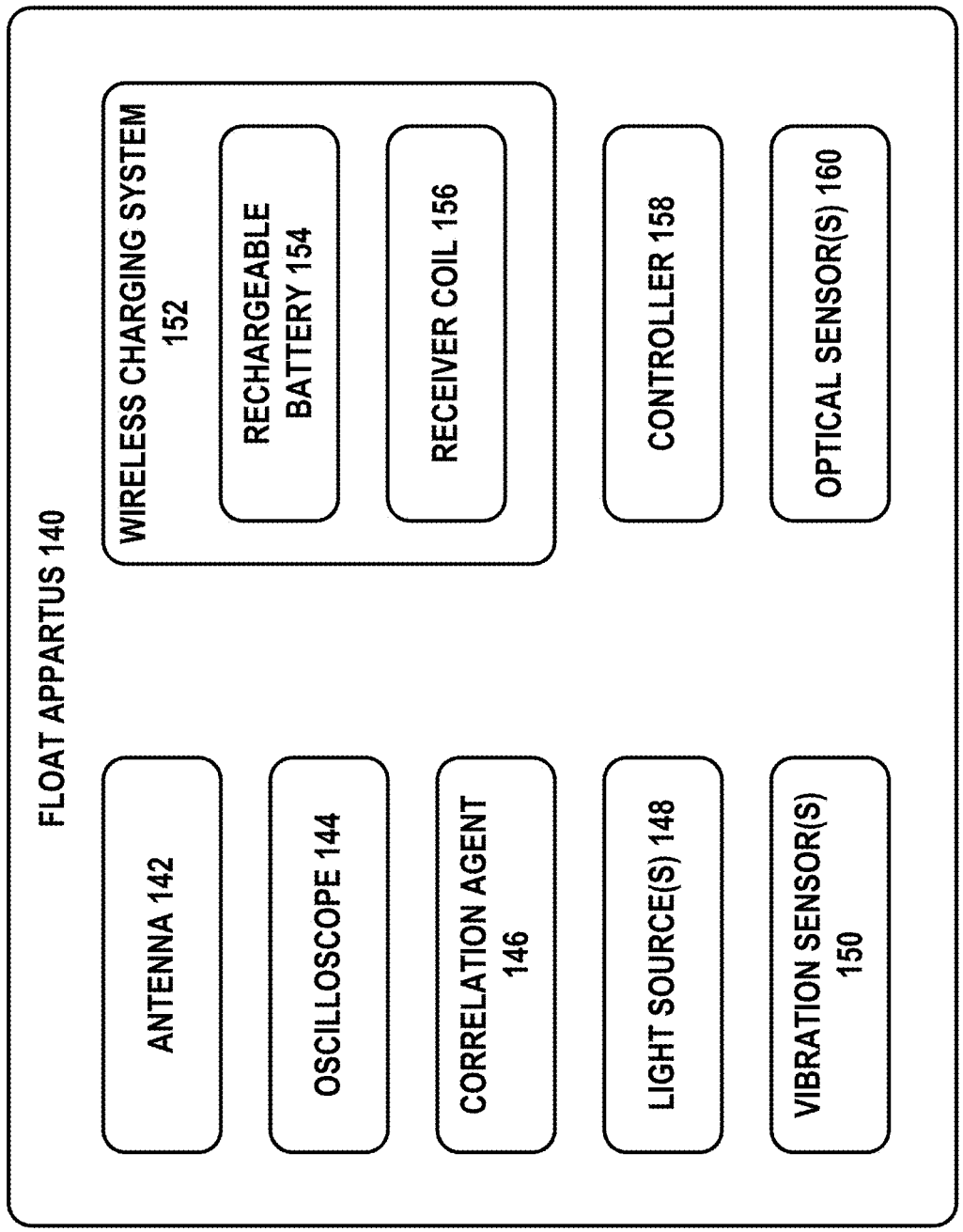
FIG. 1A is a block diagram of an example float apparatus, according to an implementation.

Implementations of the present disclosure are generally directed to a system for gauging one or more tanks and using gauging data to perform one or more tank related operations, such as managing an inventory, generating a disaster recovery plan, enabling online tank inspections, or providing advanced reporting. More particularly, implementations of the present disclosure are directed to tank gauging based on triangulation of data extracted from radio-frequency identification (RFID) signals. The data may be positioning data indicative of a position of a float apparatus in a tank, where the float apparatus may be floating on a surface of the fluid in the tank. Further implementations of the present disclosure describe positioning algorithms (also referred to as distance estimation algorithms) for determining the position of the float apparatus, and thus, approximating the fluid level in a tank.

Large quantities of liquids, such as liquid petroleum products or petrochemicals, are often stored in bulk storage containers, storage tanks or tanks. An oil depot or tank farm can include multiple tanks containing various products such as light and heavy crude, naphtha, refined products as diesel, kerosene, and jet fuel. Each tank can be configured to be refilled, for example the storage tanks can be attached to a pipeline, through which the liquid can flow within the storage tank or they can be refilled by rails, by barge, or by road tankers. Each tank can also be configured to dispense the liquid, for example by gravity drop, into a compartment of a delivery truck. Given that the quantity of liquid within each tank can vary over time, it is useful to determine the amount of a liquid stored within tanks to maintain an accurate inventory of the liquid volume of each tank.

According to one general implementation, a system configured to determine the amount of liquid stored within tanks can include an interrogator (reader or writer) and one or more RFID devices. An RFID interrogator is positioned in the center-top of the tank forming a 90-degree angle with the surface of the fluid. The interrogator determines a position of the float device (RFID device) using phased array antenna (for example by using the direction of arrival method) relative to its position, by determining a beam width and an angle. By using basic geometry, the empty part of the tank can then be calculated to yield the tank liquid level. In some implementations, the float device determines its position using one or more positioning algorithms and provides its position to the interrogator, perhaps via an RFID signal. Based on the position of the float device, the empty part of the tank can be calculated to yield the tank liquid level, perhaps using a triangulation method.

The interrogator, attached to the top of a tank, is adjusted to query the one or more RFID devices freely floating on a liquid stored within the storage tank. If multiple RFID devices are floating within the storage tank, the interrogator can selectively query each RFID device in series (for example, one at a time) or in parallel (for example, at the same time) given a pre-programmed timeout. The return signals from the one or more RFID devices are processed using a triangulation method to determine an amount of liquid within the storage tank. Optionally, the return signals can include one or more additional parameters associated to the liquid, such as the liquid temperature or one or more additional parameters associated to the storage tank, such as the integrity of the storage tank walls. The interrogator can be configured to transmit the collected and processed data to a total plant integration module (TPM) for inventory management or to pass on to other systems such as plant PCS or corporate business module For planning and control of tank farm inventories, the enhanced approach described herein can be used to accurately identify the amount of liquid stored within numerous tanks at a given point in time. As such, interrogator and RFID devices can be integrated in every tank within a tank farm for electronic reading. RFID-based methods for tracking the amount of liquid per tank can generate an efficient and reliable inventory for a tank farm. Such RFID readings can also be used to more efficiently to solve tank maintenance issues and inventory-related issues, such as fluid leak problems or blocking finishing line problems.

The RFID devices can also store detailed maintenance information including inspection test results, manpower, spare parts procurements, down times, and can interface with plant management of change system (MOC) to automatically recommend the next maintenance or inspection exercise. A detailed analysis of maintenance records can also be used to predict tank replacements or upgrade based on amount of spare parts and man hours spent on it over a given period of time.

FIG. 1A is a block diagram of an example float apparatus 140, according to some implementations. In an example, the float apparatus 140 is deployed in a storage tank that stores fluid. In this example, the float apparatus 140 is configured to float on a surface of the fluid. As described in this disclosure, the float apparatus 140 may be used to determine a level of liquid in the storage tank. As shown in FIG. 1A, the float apparatus 140 includes antenna 142, oscilloscope 144, correlation agent 146, light source(s) 148, vibration sensor(s) 150, wireless charging system 152, controller 158, and optical sensor(s) 160. Note that the float apparatus 140 is shown for illustration purposes only, as the float apparatus 140 may include additional components and/or have one or more components removed without departing from the scope of the disclosure. Further, note that the various components of the float apparatus 140 may be arranged and connected in any manner.

The antenna 142 is a transceiver that is configured to send or receive signals, perhaps to or from an interrogator apparatus. In an example, the antenna 142 is an RFID transponder that is configured to send or receive RFID signals. In other examples, the antenna 142 may send or receive other types of signals. The float apparatus 140 may use the antenna 142 to broadcast signals indicative of the apparatus's position in the tank, one or more additional parameters associated to the liquid, such as the liquid temperature or one or more additional parameters associated to the storage tank, such as the integrity of the storage tank walls, among other information.

The oscilloscope 144 is a high-precision oscilloscope that measures electrical signals, for example, signals transmitted or received by the float apparatus 140. In an example, the oscilloscope 144 measures a phase difference between a signal emitted by the float apparatus 140 and a reflection of that signal measured by the float apparatus 140. The correlation agent 146 is a device that stores positioning data of the float apparatus 140. The positioning data may be determined using one or more positioning algorithms. Additionally, the correlation agent 146 is configured to analyze the positioning data, perhaps using statistical analysis or artificial intelligence models, in order to increase an accuracy of tank level gauging.

The light source(s) 148 include one or more laser diodes, light emitting diodes (LEDs), organic light emitting diodes (OLEDs), polymer light emitting diodes (PLED), light emitting polymers (LEP), liquid crystal displays (LCD), microelectromechanical systems (MEMS), or any other device configured to transmit, reflect, and/or emit light beams. In some examples, the light source(s) 148 may be arranged at specific orientations. For instance, the light source(s) 148 may be arranged on the float apparatus 140 such that the light source(s) 148 can direct light toward particular areas in the tank, such as a top area of the tank. In some examples, the light source(s) 148 include one or more adjustable mechanical components that allow the float apparatus 140 to adjust orientations of the light source(s) 148.

The vibration sensor(s) 150 includes a piezoelectric sensor, an accelerometer, a transducer, or any other device that can measure acceleration, pressure, or vibrational changes. In particular, the vibration sensor(s) 150 can transform a measured vibration into an electrical signal having an amplitude that is based on the sensed vibration. In an example, the vibration sensor(s) 150 measure vibration signals in the tank. The source of the vibration signals may be the float apparatus 140 (or a component thereof, such as a propeller engine) or a vibration source external to the float apparatus 140.

The wireless charging system 152 includes a rechargeable battery 154 and a receiver coil 156 (also referred to as a secondary coil). The receiver coil 156 is characterized by one or more resonant frequencies. Specifically, the receiver coil 156 is configured to resonate at the same frequency as a transmitter coil (also referred to as a primary coil) of a wireless charger. When both coils are resonating at the same resonant frequency, the receiver coil 156 produces an output signal at the resonant frequency. The output signal is converted to electrical energy, which is then used to charge the rechargeable battery 154. In this "near-field" wireless charging, the charging distance can exceed a few feet from the transmitter coil. As described herein, the wireless charger may be included in the interrogator or may be a standalone device.

The controller 158 includes or more processor(s), data storage, and program instructions for controlling operations of the float apparatus 140. In an example, the controller 158 may generate custom propulsion plans for the float apparatus 140 based on positioning information of the apparatus, which may be determined using one or more of the disclosed positioning algorithms. For instance, the controller 158 may generate custom propulsion plans to perform activities such as routine structure inspection and to commence wireless charging. The controller 158 may then cause a propulsion system (for example, propulsion system 218 of FIG. 2), to move the float apparatus 140 according to the determined propulsion plan. The propulsion plan may include a starting point, a destination point, and one or more paths between the starting point and the destination point. In some examples, the controller 158 may communicate the propulsion plans with the interrogator apparatus within the tank. The controller 158 may also store data collected by the float apparatus 140 (for example, position data, fluid information, data associated with the tank). The controller 158 may then communicate the data to the interrogator apparatus within the tank. In an implementation, the information provided by the float apparatus can be used to enable digital transformation processes by facilitating dashboarding, advanced data analytics, and artificial intelligence capabilities.

The optical sensor(s) 160 includes a camera, light detector, photosensor, photodiode, charge-coupled device, photoresistor, photomultiplier, image sensor, or photodetector for capturing optical signals. In some examples, the optical sensor(s) 160 are arranged at specific orientations. For instance, the optical sensor(s) 160 are arranged on the float apparatus 140 such that the optical sensor(s) 160 can measure light that is emitted by or reflected form particular areas in the tank, such as a top area of the tank. In some examples, the optical sensor(s) 160 may include one or more adjustable mechanical components that allow the float apparatus 140 to adjust orientations of the optical sensor(s) 160.

Figure 1B:
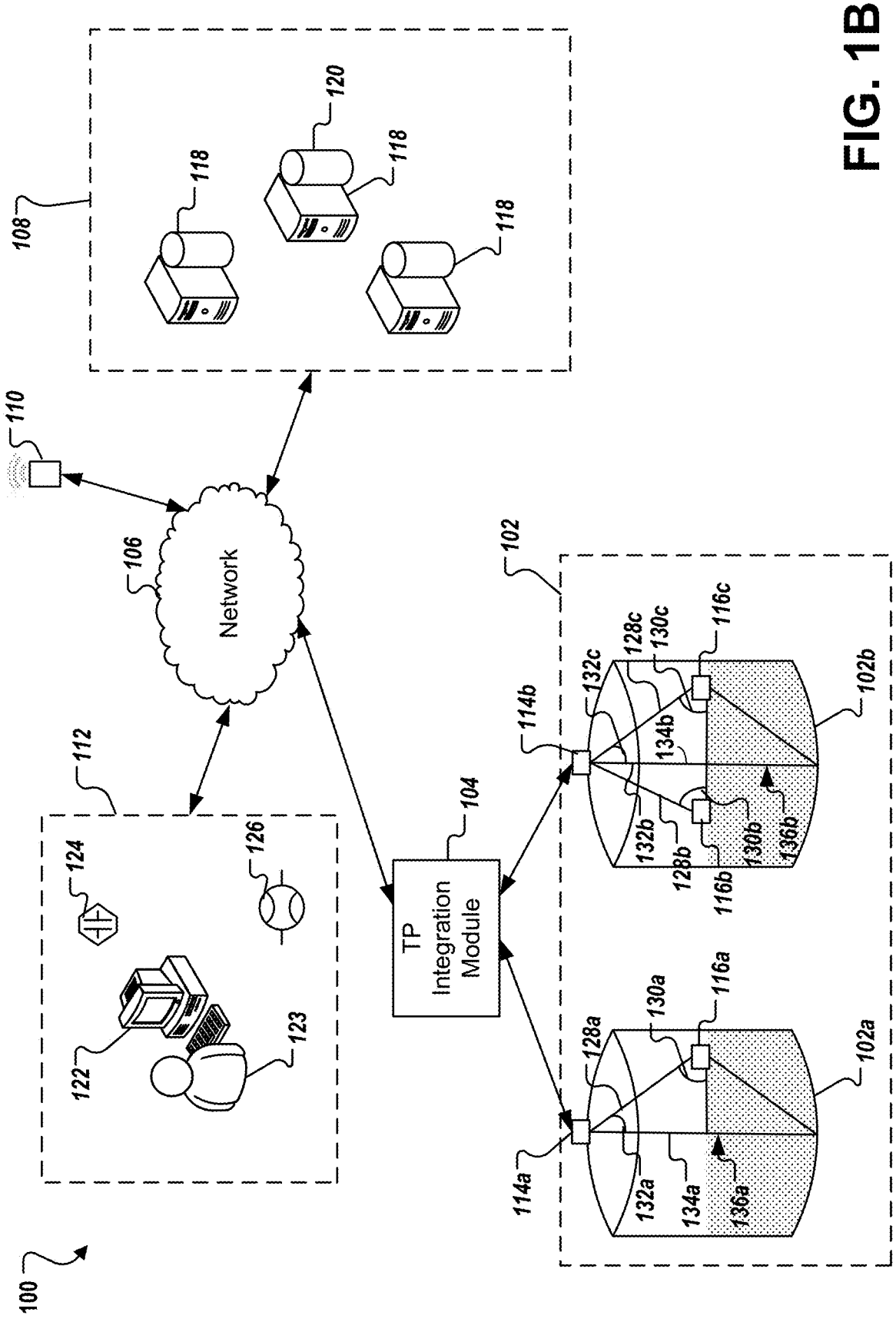
FIG. 1B is an example system, according to an implementation.

FIG. 1B depicts an example system 100 that can be used to execute implementations of the present disclosure. The implementation depicted in the example system 100 can be used, for example, to provide tank gauging data for inventory management. In the depicted example, the example system 100 includes a tank farm 102, a TPM 104, a network 106, a server system 108, one or more remote devices 110, and a process control network 112. The storage tank farm 102 includes one or more tanks 102a, 102b. At least one of the one or more tanks 102a, 102b includes an interrogator 114a, 114b and one or more RFID devices 116a, 116b, or 116c. The server system 108 includes one or more server devices 118, at least one of the one or more server devices 118 including a database 120. The process control network 112 can include a computing device 122, one or more sensors 124, and one or more meters 126.

In the depicted example, two tanks 102a, 102b are illustrated as included in the storage tank farm 102. Even though, not illustrated in FIG. 1B, the storage tank farm 102 can include a different number of tanks, such as tens or hundreds of tanks. The storage tanks 102a, 102b can be configured to store large volumes of liquid, such as petroleum products or petrochemicals. The storage tanks 102a, 102b can include known geometrical characteristics, such as shape, height, base surface, base width, base length, or base radius. The geometrical shape of the storage tanks 102a, 102b can include cylinders (as illustrated in FIG. 1B), rectangles, or other shapes. The knowledge of the storage tank's height and geometrical characteristics (for example, the storage tank's base) can be used to estimate its storage capacity.

Each tank 102a, 102b can be configured to include an interrogator 114a, 114b and one or more RFID devices 116a, 116b, or 116c. The storage tanks 102a, 102b can be configured to enable RFID devices 116a, 116b, or 116c to freely float on the surface of the liquid, such that no guiding rails nor other components of the storage tank 102a, 102b limit the location of the RFID devices 116a, 116b, or 116c and each of the RFID devices 116a, 116b, or 116c can be positioned at any location on the surface of the liquid within the storage tank at any given point in time. In some implementations, a tank, such as tank 102a can include a single interrogator 114a and a single RFID device 116a. In some implementations, a tank, such as tank 102b can include a single interrogator 114b and a plurality of RFID devices 116b, 116c. The interrogators 114a, 114b can include an RFID reader/writer, a control processor, and a coordinator. The interrogators 114a, 114b can be attached to the top of a tank 102a or 102b, at a known distance from the side walls of the storage tank and the bottom of the storage tank. For example, the interrogators 114a, 114b can be attached to the top of the storage tank in a position that intersects the central vertical axis of the storage tank. The interrogators 114a, 114b can scan items within a scan envelope defined in part, for example, by scan directions and the characteristics of the storage tank. Specifically, the scan direction can be multi-directional and directed towards the surface of the liquid stored within the storage tank 102a, 102b. Generally speaking, a 'scan envelope' refers to the whole two- or three-dimensional space in which interrogators 114a, 114b can communicate with RFID devices 116a, 116b, or 116c. In some implementations, the RFID devices 116a, 116b, or 116c are configured to broadcast their identity over regular intervals and their readiness to receive commands from the respective interrogator 114a, 114b.

The interrogators 114a, 114b can be configured to power the battery of the RFID devices 116a, 116b, or 116c, to generate and transmit RF signals to one or more RFID devices 116a, 116b, or 116c freely floating within the same tank 102a or 102b and receive RF responses from the floating RFID device 116a, 116b, or 116c. The interrogators 114a, 114b can be configured to uninterruptedly and repeatedly transmit an instruction signal for a preset time period on a particular channel for a particular RFID device 116a, 116b, or 116c floating within the same tank 102a or 102b as the interrogator 114a or 114b. For example, the interrogator 114a of tank 102a can transmit an instruction signal to RFID device 116a, the interrogator 114b of tank 102b can transmit a first instruction signal to RFID device 116b during a first time period and a second instruction signal to RFID device 116c during a second time period. The instruction signal can include an action instruction index.

RFID devices 116a, 116b, 116c can include multiple components configured to perform a plurality of operations. The operations include acquiring data related to the respective tank 102a, 102b, acquiring data related to an amount of liquid within the storage tank 102a, 102b, changing a position of the RFID device 116a, 116b, 116c within the storage tank 102a, 102b, and communicating data to the interrogator 114a, 114b. The components and operations are discussed in detail with reference to FIG. 2.

The TPM 104 can include one or more processors. The TPM 104 can be configured to be in wired or wireless communication with one or more interrogators 114a, 114b of the storage tank farm 102 and integrate data received from the interrogators 114a, 114b before sending it to the server system 108. Such communication can include short-range communication, such as by using a BLUETOOTH, WIFI, a radio-frequency transceiver or other adequate transceivers. The TPM 104 can be configured to provide local tank management information. For example, TPM 104 can be configured to provide "immediate" data analysis and decision making based on a capacity planning, tank integrity, product movement, and custody transfer information. The TPM 104 can transmit data received from the interrogators 114a, 114b over the network 106 to the computing device 122, the remote devices 110, and to the server system 108. In some implementations, the server 108 is embedded in TPM 104.

TPM 104 can include one or more protection features (for example, a protective "seal" on the casing) to protect against adverse weather conditions and against tampering with TPM module. For example, TPM 104 can include a housing, constructed to be weather proof and vandal proof, that enables the installation of TPM 104 outdoors or in relatively hostile environment. The housing can include a material that can provide system protection in severe corrosive environments, such as stainless steel NEMA Type 4X or IEC 60529 Type IP66. The TPM 104 can include one or more features for sturdy mounting to avoid potential vibration. The system mount can be designed to support the maximum weight of system and enclosure assemblies. The TPM 104 can include a grounding terminal. The TPM 104 can be configured to be continuously available and reliable by including an embedded uninterrupted power supply (UPS) on both the TPM 104 and interrogators 114a, 114b. The power supply can be configured to enable the TPM 104 to operate for at least 60 minutes in the event of power loss, to provide the ability to extract important data and critical reports in power outage situations. The protection features can be electronically guided and operated so that if damaged or broken (for example, when the case of TPM 104 is opened), an electronic "flag" can be sent to the computing device 122 or the remote devices 110. The seal logic and mechanism can be powered by an internal battery to ensure continuous operation even if the TPM 104 is unplugged from wall power.

The computing device 122 and the remote devices 110 can be configured to receive data from the TPM 104, from one or more sensors 124, from one or more meters 126, and the server system 108 over the network 106. The sensors 124 and the meters 126 can be configured to collect data associated to the liquids stored within the storage tank farm 102 and one or more components of the storage tank farm 102. For example, the sensors 124 can be configured to identify fluid leaks or to detect smoke. The sensors 124 can include an industrial grade camera with on-demand IR capability and LED flash light (with Narrow & Wide Beam capability) that are employed to detect cracks, corrosion, or debris. The RFID devices 116a, 116b, 116c can include a processor configured to correlate new images captured by the camera to stored images of the respective tank and report any misalliance. A fitted propeller can be used to navigate the RFID devices 116a, 116b, 116c towards a particular area of the tank corresponding to the misalliance to enable the camera to capture additional pictures of the area with higher resolution.

The meters 126 can be flow meters, which provide additional information about the amount of liquid stored by the storage tank farm 102. The data received by the computing device 122 can be displayed to a user 123. In the depicted example, a user 123 interacts with the computing device 122. In an example context, the user 123 can include a user, who interacts with an application that is hosted by the server system 108, such as an inventory management system, as described with reference to FIGS. 2 and 3. Even though, not illustrated in FIG. 1B, a plurality of users can interact with the application that is hosted by the server system 108. For example, one or more users can interact with the application that is hosted by the server system 108 to select tank inventory data created and stored within the database 120.

In some implementations, each computing device 122 includes at least one server and at least one data store. In general, server systems accept requests for application services and provide such services to any number of client devices (for example, the computing device 122) over the network 106. In some implementations, the server system 108 can include the database 120 configured to provide a central point through which service-providers can manage and access data related to tank farm inventory and management services.

In accordance with implementations of the present disclosure, the server system 108 can host applications including data retrieval, data processing, and inventory management that can be displayed to the user 123 on the computing device 122. In some examples, data records are received by the server system 108 to process data received from the storage tank farm integration module 104 based on a query received from the computing device 122. In some examples, the computing device 122 indicates which portion of the data record to be processed and can execute a data visualization software that retrieves data from the server system 108 and generates the data visualization. For example, the computing device 122 can store and execute software, such as an operating system or application modules. Application modules can include routines, programs, objects, components, or data structures that perform particular tasks or that implement particular inventory management functions.

The database 120 can be an in-memory database, data processing and application platform, which includes a database (DB) and an application service, where the database includes an engine and a driver. In some examples, the data that is to be sent from the database 120 and visualized on the computing device 122, can be retrieved over the network 106 from the server system 108 or from external databases. In some examples, data is automatically retrieved (for example, at particular intervals) or randomly retrieved from one or more external sources and stored in the database 120 of the server system 108. In some examples, the user 123 can generate instructions to retrieve the data for inventory analysis. In some examples, user 123 can include a private person, a service agency, or a company.

In general, implementations of the present disclosure enable identification of amounts of liquids stored within tanks 102a, 102b and management of inventory based on the amounts of liquid and one or more additional parameters. More particularly, the height of one or more RFID devices 116a, 116b, or 116c and geometrical characteristics of a tank's base can be used to estimate the amount of liquid stored within the storage tanks 102a, 102b. For example, one or more RFID devices 116a, 116b, or 116c can transmit location data to a corresponding interrogator 114a, 114b.

The interrogator 114a, 114b can process the location data using triangulation algorithms to determine the height of one or more RFID devices 116a, 116b, 116c and to estimate the amount of liquid stored within the storage tanks 102a, 102b. Triangulation algorithms include determining the location of a point by forming triangles to it from known points.

According to implementations of the present disclosure the storage tank's height (TH) 136a, 136b, RFID beam length (BL) 128a, 128b, 128c, and interrogator angle ($\alpha$) 132a, 132b, 132c can be used as inputs for the triangulation algorithm. TH 136a, 136b can be extracted from a database, such as database 120 or a storage device of the RFID device 116a, 116b, 116c. BL and $\alpha$ can be determined by the interrogator 114a, 114b as it compares and analyzes signals arriving at two identical receivers with closely spaced antennas.

The output of the triangulation algorithm can include the transmission angle ($\theta$) 130a, 130b, 130c and the RFID device height (DH). B 130a, 130b, 130c can be determined based on a 132a, 132b, 132c ($\theta=90-\alpha$). The RFID device height (DH) 134a, 134b corresponds to the perpendicular distance between the liquid surface and top of the storage tank. DH 134a, 134b can be determined, by applying trigonometric functions to the triangle formed by BL, the liquid surface (LS), and DH:

$$\sin\theta = \frac{DH}{BL}$$

$$\cos\theta = \frac{LS}{BL}$$

$$\tan\theta = \frac{DH}{LS}$$

For example, DH can be determined as (sin $\theta \cdot$ BL) and the liquid height (LH) can be determined by subtracting DH from TH. The actual liquid volume in the storage tank can be determined by multiplying LH by the base area of the storage tank. For tanks that include multiple RFID devices, the amount of liquid can be determined by averaging the determined DH based on data from each RFID device 116b, 116c. The average of the multiple estimates increases the accuracy of the results. The interrogator 114a, 114b and the one or more RFID devices 116a, 116b, 116c can be configured to automatically or semi-automatically collect and analyze data to estimate the volume of liquid in each storage tank of the storage tank farm.

In an embodiment, a float apparatus, such as one of the RFID devices 116a, 116b, or 116c, determines its position in the storage tank using one or more positioning algorithms. The float apparatus advertises its position to an interrogator apparatus, such as interrogators 114a, 114b, which uses the position to determine a fluid level in the storage tank, perhaps using a triangulation algorithm.

Positioning algorithms for determining a position of a float apparatus in a storage tank fall into one of two categories. The first is a one-dimension (1D) category in which positioning algorithms calculate a float apparatus position on a horizontal plane to obtain an offset angle ($\theta$) from a center of the tank. The second is a two-dimension (2D) category in which positioning algorithms calculate a float apparatus position on a vertical plane and calculate an inclined float distance (z), for example, from a top of the storage tank. Then, the offset angle ($\theta$) and the inclined float distance (z) are used to calculate a two-dimensional float apparatus position within the storage tank. As described previously, the fluid level in the tank can be determined from the calculated two-dimensional position.

Both categories of algorithms utilize instrumentation onboard the float apparatus in order to calculate the float position. In an example 1D algorithm, the float apparatus's horizontal position ($\theta$) is determined using image analysis performed on images captured by an on-board image sensor. In this example, as the float apparatus moves on the fluid surface, advanced image analysis (for example, using artificial intelligence) of dimensions of certain reference points inside the tank structure (for example, the center of tank holding the integrator apparatus) provide an accurate approximation of the float apparatus's angular position on the fluid surface.

In another example 1D algorithm, the float apparatus's position is determined using an analysis of reflected light pulsations (for example, from an on-board light source) against reflecting material on inner walls of the storage tank. In this example, an intensity of the light reflections is inversely proportional to the distance between the light source and the reflecting material. As such, analyzing the intensity of captured reflections provides an accurate approximation horizontal positioning of the float apparatus to the center of the tank.

In an embodiment, a float apparatus deployed in a storage tank is configured to perform one or more positioning algorithms to determine its position in the storage tank. The positioning information can be routinely advertised by the float apparatus and received by the interrogator apparatus for system-wide access. For example, the interrogator apparatus uses the float apparatus's positioning information to estimate an amount of liquid stored in the storage tank.

In an embodiment, a first disclosed positioning algorithm is based on an optical distance assessment. In this algorithm, a light detection system of the float apparatus measures light that is reflected from or emitted by an optical target in the storage tank. The optical target is attached to a known location within the tank, such as an area near a top of the storage tank. The light detection system includes optical sensors, such as cameras, that are arranged on the float apparatus such that the sensors measure light emitted by or reflected from the optical target. Based on the measured light, the float apparatus may identify the optical target, and may calculate an inclined distance between the optical target and the float apparatus. In an example, the respective angles between each of the optical sensors and the optical target and a horizontal distance between the optical sensors on the float apparatus can be used to calculate a two-dimensional float position within the storage tank. For instance, the respective angles between each of the optical sensors and the optical target, and the horizontal distance between the optical sensors can be used to calculate a vertical distance (for example, a perpendicular distance) between the float apparatus and a top of the tank.

In a first implementation, the optical distance assessment algorithm involves the float apparatus operating in an active mode in which the apparatus illuminates the optical target. Specifically, one or more light sources (for example, LED lights) of the light detection system are arranged at specific angles with respect to the optical target. The one or more light sources illuminate the optical targets such that the light reflected from the optical target is directed toward the optical sensors. The emitted light may be in continuous, pulsed, or modulated modes. The optical sensors then measure the light reflected from the optical target. In a second implementation, the optical distance assessment algorithm involves the float apparatus operating in a passive mode in which the optical target emits light toward the optical sensors, which then measure the emitted light. In both implementations, the measured light frequency may be used to calculate an inclined distance between the float apparatus and the optical target.

In some examples, the storage tank may include more than one optical target. In such examples, the float apparatus may execute the optical distance assessment algorithm using more than one optical target. The float apparatus may then compute an average of the calculated distances from each optical target. Alternatively, the float apparatus may execute the algorithm using only one optical target, even if the more than one optical target is present.

Figure 1C:
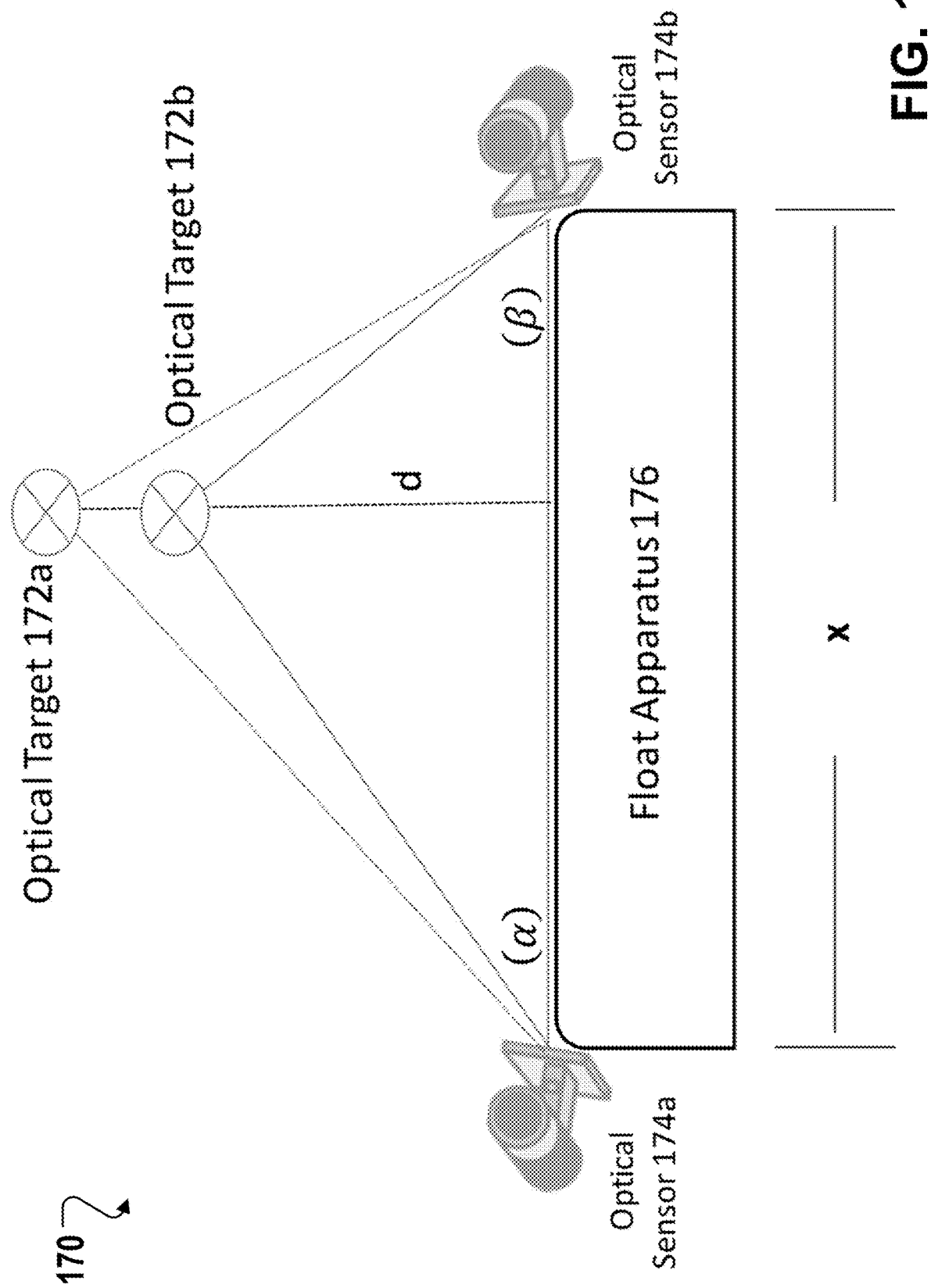
FIGS. 1C and 1D are examples of an optical distance assessment positioning algorithm, according to some implementations.
Figure 1D:
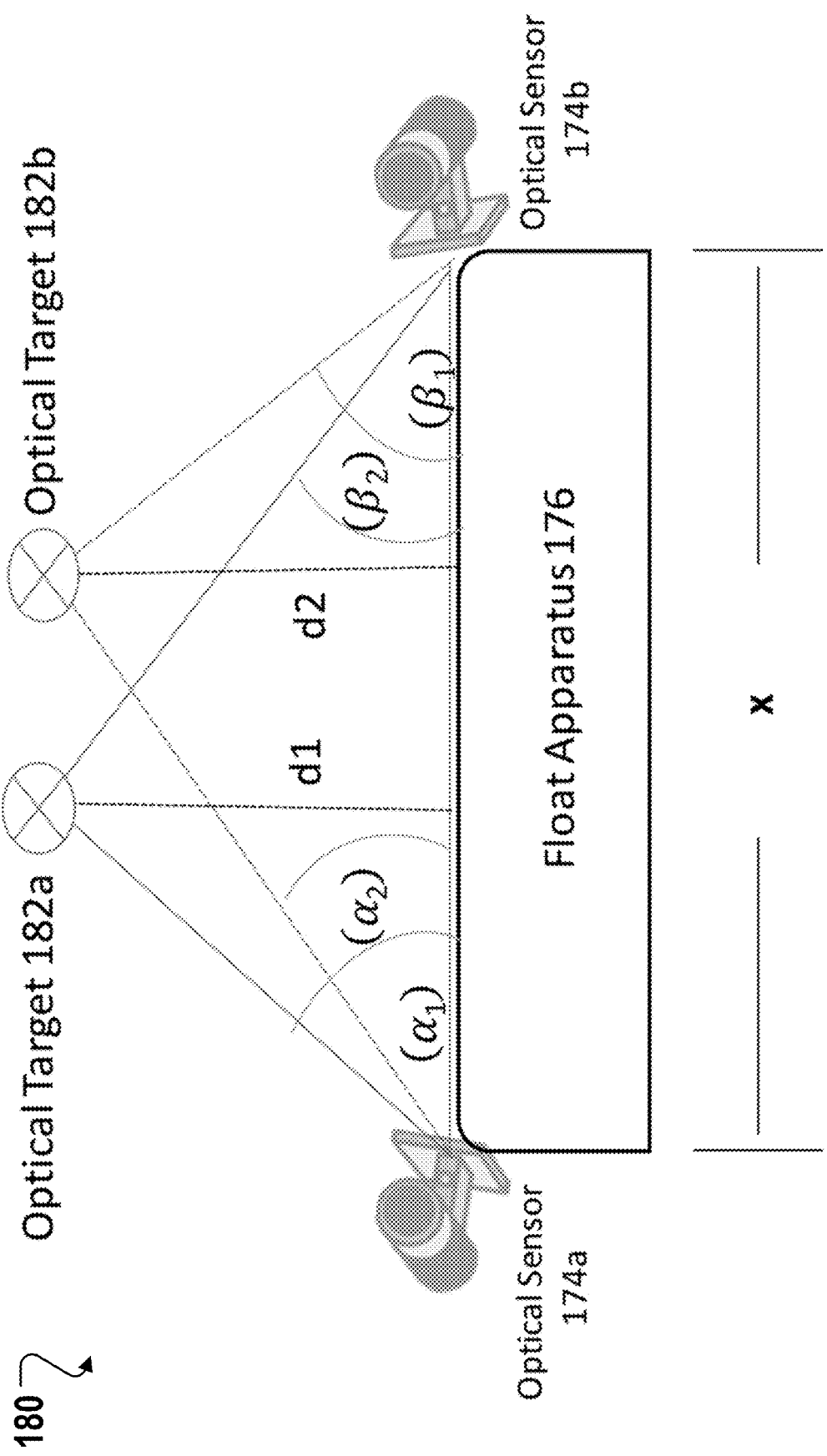

FIGS. 1C and 1D are examples of an optical distance assessment positioning algorithm, according to some implementations. In these examples, a float apparatus 176 is deployed in a storage tank that stores a fluid. The storage tank includes two optical targets that are attached to a known location in the tank, for example, a top area of the tank. The float apparatus 176 includes two optical sensors 174a, 174b that are arranged at respective angles such that the sensors can capture light that is reflected by or emitted from the optical targets. The float apparatus 176 also includes two light sources (not illustrated in FIGS. 1C and 1D), which are used by the float apparatus 176 when operating in active mode. While these examples use two optical targets, two lights sources, and two optical sensors, other numbers of targets, light sources, and optical sensors are possible.

In an embodiment, the optical distance assessment algorithm calculates a perpendicular distance between the optical targets and the float apparatus. In example 170 of FIG. 1C, two optical targets 172a, 172b are vertically aligned in the storage tank. As shown in FIG. 1C, the two optical sensors 174a, 174b are oriented at angles ($\alpha$), ($\beta$), respectively, with respect to the optical targets 172a, 172b. In this arrangement, the optical sensors 174a, 174b capture light that is reflected from or emitted by the optical targets 172a, 172b. As such, the optical distance assessment positioning algorithm involves vertical sampling to determine a shortest perpendicular distance between the float apparatus 176 and the optical targets 172a, 172b. In this example, the shortest perpendicular distance is distance d between the float apparatus 176 and the optical target 172b. In an example, the optical target with the shortest perpendicular distance is determined based on a measurement of light emitted from or reflected by more than optical target. In another example, the perpendicular distance between each of the targets is calculated and compared to determine a shortest perpendicular distance.

Once the optical target with the shortest perpendicular distance to the float apparatus 176 is identified, the respective angles between the optical sensors and the optical target are determined. Then, the distance d is calculated based on the respective angles and a horizontal distance between the two optical sensors 174a, 174b. As shown in FIG. 1C, the angles between the optical sensors 174a, 174b and the optical target 172b are ($\alpha$, $\beta$), respectively. Further, the distance between the optical sensors 174a, 174b is x. Accordingly, the distance d is calculated in Equation (1) as:

$$d = \frac{x}{\frac{1}{\tan\alpha} + \frac{1}{\tan\beta}} \qquad \text{Equation (1)}$$

In example 180 of FIG. 1D, two optical targets 182a, 182b are horizontally aligned. As shown in FIG. 1D, the two optical sensors 174a, 174b are oriented at angles ($\alpha_1$), ($\beta_1$), respectively, with respect to the optical target 182a. Further, the optical sensors 174a, 174b are oriented at angles ($\alpha_2$), ($\beta_2$), respectively, with respect to the optical target 182b. In this example, because the perpendicular distance from each of the optical targets 182a, 182b to the float apparatus 176 is identical or nearly identical, the optical distance assessment algorithm may calculate the perpendicular distance from one of the optical targets 182a, 182b, or both. To calculate the perpendicular distance using both optical targets, the optical distance assessment algorithm calculates an average of the distances (d1, d2) from the optical targets 182a, 182b.

In an embodiment, a second positioning algorithm uses a measured phase shift between a transmitted light and a measured reflected light to determine a position of the float apparatus. In this embodiment, a light source of the float apparatus emits a light beam, perhaps with modulated intensity, toward a specific point in the storage tank, for example, near a top area in the storage tank. An optical sensor of the float apparatus measures the light reflected from the specific point. This reflected light will be phase shifted when compared to the transmitted light. In an example, the phase shift can be measured by an oscilloscope. This phase shift is then used to measure the distance between the light source and the reflecting material. Specifically, Equation (2) is used to calculate a change in wavelength between the transmitted and reflected waves. And Equation (3) is used to calculate the distance based on the change in wavelength.

$$\Delta \lambda m = \frac{\varphi \lambda m}{2\pi} = \frac{c\varphi}{2\pi fm} \qquad \text{Equation (2)}$$

$$d = \frac{1}{2}(M\lambda m + \Delta \lambda m) \qquad \text{Equation (3)}$$

In Equations (2) and (3), λm is the wavelength of the waves, M is an integer number of wavelengths, φ is a phase shift between the two waves, c is the speed of light, and f is the frequency of the waves.

Figure 1E:
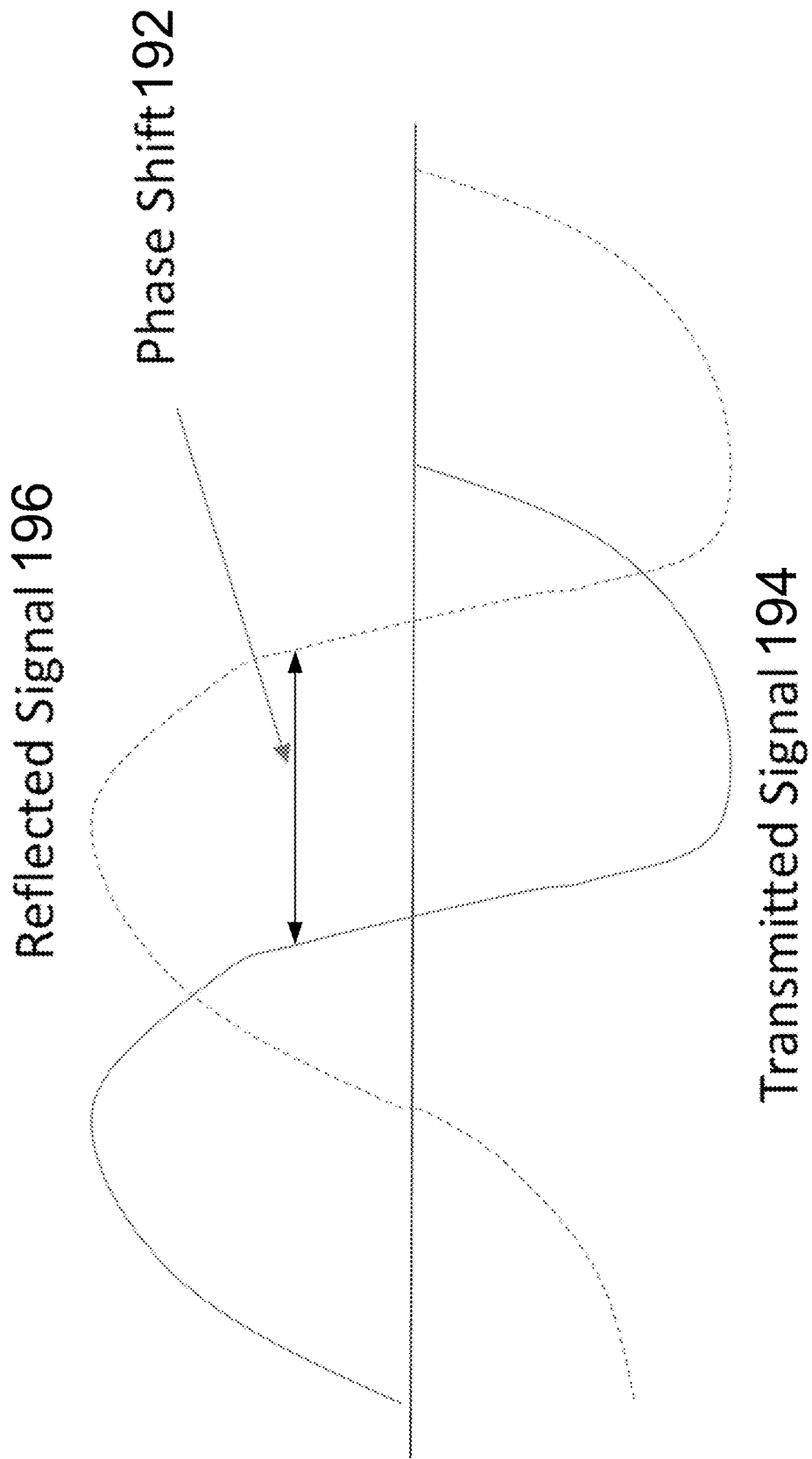
FIG. 1E is an example phase shift between a transmitted signal and a reflected signal, according to an implementation.

FIG. 1E illustrates an example phase shift between a transmitted signal and a reflected signal, according to some implementations. As shown in FIG. 1E, a phase shift 192 is measured between a transmitted signal 194 and a reflected signal 196. The transmitted signal 194 may, for example, be an intensity modulated light wave that is directed toward a reflecting material fixed in a known location in the tank (for example, in a top area of a tank).

In an embodiment, a third positioning algorithm is based on image analysis of images captured by the float apparatus. In this embodiment, the float apparatus uses an image sensor (for example, a camera) to capture an image of a marker arranged in a known location within the storage tank. The algorithm uses the image to calculate a distance, d, between the float apparatus and the marker. In an example, the distance, d, is calculated using Equation (4):

$$f = \frac{(p \times d)}{w} \qquad \text{Equation (4)}$$

In Equation (4), f is a focal length of the image sensor, p is an apparent width in pixels to the marker, and d is a distance of the marker from the image sensor. In an example, the image sensor captures a series of images of the marker at different distances from the marker. The algorithm then calculates an accumulative average representing a mean distance of the marker from the image sensor.

In an embodiment, a fourth positioning algorithm is based on a power transfer efficiency. As described previously, the float apparatus includes a battery that can be charged by a wireless charger (for example, included in the interrogator apparatus that is attached to the top of the tank). In principle, the wireless power charging utilizes two coils: a transmitter coil of the wireless charger and a receiver coil of the float apparatus. Generally, as the two coils move apart, the power transfer efficiency decreases since the resonant coupling between the transmitter and receiver coils decreases with distance. Thus, the power transfer efficiency between the fixed wireless charger and the mobile float apparatus changes as the distance between them changes. In an example, the algorithm detects different rates of power transfer efficiency as the distance between the coils changes. The algorithm maps the rates of power transfer efficiency to the detected distances between the float apparatus and the wireless charger. Because the wireless charger is located in a known location, the position of the float apparatus in the storage tank can be measured.

In an embodiment, a fifth positioning algorithm is based on a vibration signal. In this embodiment, a vibration sensor measures and analyzes a vibration frequency that is generated by a propulsion engine on-board the float apparatus or generated by a standalone vibration source in a known location. Within examples, the vibration sensor may be included in the float apparatus or be arranged in a known location in the tank (for example, an area near a top of the storage tank). The position of the float apparatus is calculated based on the vibration frequency.

In some embodiments, one or more of the positioning algorithms may be executed by the interrogator apparatus or a device other than the float apparatus. In one embodiment, the position of the float apparatus is determined based on a power output of a photocell as it receives light emitted by a light source of the float apparatus. The photocell is installed in a fixed and known location (for example, in an area near a top of the storage tank). In an example, different power levels can be detected and mapped to distances between the float apparatus and the photocell. Because the photocell is located in a known location, the position of the float apparatus in the storage tank can be measured.

In some embodiments, a combination of more than one of the described positioning algorithms can be used to generate float positioning data. In one embodiment, the results of the positioning algorithms are calculated and stored in a correlation server. The correlation server analyzes the results, perhaps using statistical analysis, in order to increase the accuracy of the positioning results, thereby increasing the accuracy of the tank level gauging.

Figure 2:
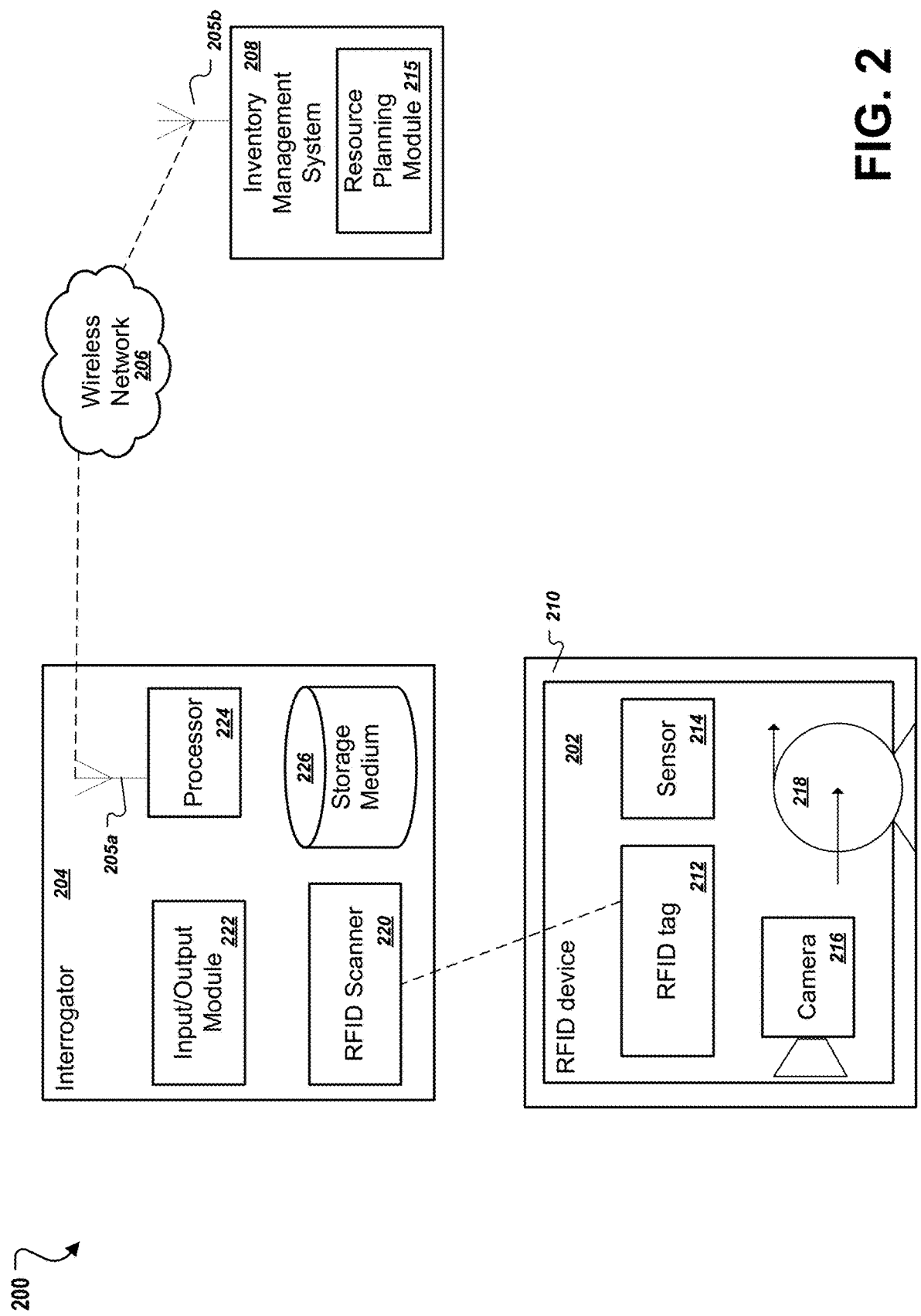
FIG. 2 is an example system, according to an implementation.

Turning to FIG. 2, FIG. 2 is a block diagram 200 showing exemplary components of a system for improved registering of tank gauging data within a tank farm. As depicted, the system 200 includes an RFID device 202, an interrogator 204 that can be attached to a tank and can communicate with a back-end tank farm inventory management system 208. The communication can occur, for example, across any suitable wireless network 206 (for example, using ACTIVE BAT, CRICKET, or any other type of network) using multiple antennas 205a (one included within each of one or more tank interrogators 204) and an antenna 205b included within the inventory management system 208.

The RFID device 202 can be similar to the RFID devices 116a, 116b, 116c described with reference to FIG. 1B. As such, the RFID device 202 can include a casing 210, an active RFID tag 212, a sensor 214, a wireless rechargeable battery, Wireless-Hart gateway, a pan tilt and zoom (PTZ)

camera 216, and a propulsion system 218. The casing 210 can be configured to enable the RFID device 202 to freely float on the surface of the liquid stored within the storage tank, such that the components of the RFID device 202 do not get in direct contact with the liquid. The casing can be configured to be transparent to the electromagnetic signals to enable communication between the interrogator 204 and the RFID tag 212. The casing 210 can include walls manufactured from non-corrosive material. At least a portion of the walls can be configured to be opened and closed for maintenance procedures of the RFID device 202.

The active RFID tag 212 can include an integrated circuit with programmable or re-programmable procedure memory, wireless re-chargeable battery, antenna, clock, LED flash light, high-stability oscillator such as piezo-electric, quartz, or ceramic resonator, and volatile or non-volatile data memory. The wirelessly-charged battery onboard the float can additionally be configured to receive inducted power beam from the interrogator to charge the battery, and an alerting capability if the power-beam is weak or not fully operational, thus avoiding eventual battery exhaustion. The active RFID tag 212 can be configured to receive signals from the interrogator and store data received from one or more other components of the RFID device 202, such as the sensor 214 or the camera 216. The active RFID tag 212 can be configured to receive an instruction signal from the interrogator 204 during the time period of an interception state and perform an operation in response to an action instruction index. For example, the active RFID tag 212 can be configured to search out the action instruction corresponding to the action instruction index from the index-action mapping relationship, and execute the action instruction. The action instruction can include sending an RF response, sending data recorded by the sensor 214 (for example, temperature data), sending images captured by the camera 216 (for example, images of a portion of the storage tank wall that presents a potential damage), or modifying the location of the RFID device by using the propulsion system 218. The propulsion system can include a motor rotated impeller, a directive induced magnetic field (for example, the RFID device contains a magnetized guiding component) or any other propeller. For example, the camera 216 can be configured to continuously or periodically scan the storage tank walls and the processor can be configured to image process the images captured by the camera to verify the integrity of the walls and to detect any wall damage. The camera can receive commands from the operator to inspect a particular area of the tank using pan, tilt and zoom features and illuminate that section with a built-in light source, such as a LED light fixture. The propulsion system 218 can be configured to move the RFID device between a plurality of positions on the surface of the liquid within the entire area of the storage tank, to facilitate the scan process of the storage tank walls. For example, the propulsion system 218 can provide a 360-degree view to the camera 216 and can modify the distance and the angle of the RFID device 202 relative to potential wall damage to enhance the accuracy and resolution of the wall damage detection. The propulsion system design can include a directive induced magnetic field. The magnetic field can control the movement of the RFID device 202, which includes a magnetized guiding element. The magnetic field is energized on demand in the intended direction of movement of the RFID device 202. In some implementations, the propulsion system design can include a liquid pump that is configured to move the RFID device 202.

The interrogator 204 can be similar to the storage tank interrogators 114a and 114b described with reference to FIG. 1B. As such, an interrogator 204 can be attached to a top portion of a tank of a tank farm. For example, each interrogator 204 can be mounted approximately in the center of the top of a tank in order to scan the RFID tags freely floating on the surface of a liquid stored within the storage tank. The scanning can occur, for example, continuously, at preset intervals (for example, hourly, daily, or weekly) or based on one or more events (for example, before or after an event known to affect an amount of a liquid within a tank of the farm). As described above, the interrogator 204 can be configured to generate and transmit RF signals to one or more RFID devices 202 floating within the same tank and receive RF responses from the floating RFID devices. In some implementations, the RFID devices 202 are configured to broadcast their identity at regular time intervals and transmit signals indicating their readiness to accept instruction signals from the interrogator 204.

For example, the interrogator 204 can be configured to uninterruptedly and repeatedly transmit an instruction signal for a preset time period on a particular channel for a particular RFID device 202 floating within the same tank as the interrogator 204. For example, the interrogator 204 can transmit an instruction signal to a first RFID device during a first time period and a second instruction signal to a second RFID device during a second time period. The instruction signal can include an action instruction index that can be processed by the RFID device to perform a selected operation.

The interrogator 204 can include an RFID scanner 220, an input/output module 222, a processor 224, and a storage medium 226. The RFID scanner 220 can be any scanner that is operable to send and receive signals to tags, such as active RFID tags. The RFID scanner 220 can further be range-adjustable to increase or decrease its scanning envelope, capable of scanning in programmable directions, and capable of having its parameters tuned. The tunable parameters can include select parameters for tag populations (for example, using masks to select specific RFID tag IDs) that enable the interrogator 204 to selectively communicate with each RFID tag within the corresponding tank. The tunable parameters can include frame length (for example, the time duration in which to scan), or any other parameters that can be tuned within various protocols. The RF response generated by the active RFID tags 212 can be processed by the interrogator 204 to determine location data that includes the distance from RFID device 202 to corresponding interrogator 204 and angles associated with location of the RFID device 202. The data can be retrieved by the interrogator 204, further processed by processor 224, stored by storage medium 226, or sent to the inventory management system 208.

The processor 224 can determine, using the RFID tag's current location and location information in the storage medium 226, the total amount of liquid within the storage tank. The input/output module 222 can provide the input and output of location data used by the interrogator 204. For example, the input/output module 222 can serve as an interface for sharing liquid amount information or other tank or RFID tag information between the storage medium 226 and the inventory management system 208.

The storage medium 226 can contain information that is included or associated to the RFID tags. For example, the storage medium 226 can include identification information for each RFID tag that can be scanned by the interrogator 204. The identification information can include, for example, an item identifier, tank farm name, location, tank name, type of product, location (for example, distance from walls and bottom), a timestamp indicating the last time the RFID tag was scanned, an inventory quantity (for example, an amount of liquid derived based on the position of the RFID tag), and any other fields that can be useful in tracking the amount of liquid within the storage tank. Information stored in the storage medium 226 can be updated in several ways, including as a result of the RFID scanner 220 scanning RFID tags or as updated information is received from the inventory management system 208. Further, updated information in the storage medium 226 can be transmitted to the inventory management system 208 in real-time (for example, as it is updated by the RFID scanner 220) or at scheduled intervals (for example, every five minutes, twice a day, once a week, or at other time intervals). The interrogator 204 can use information stored in the storage medium 226, for example, to scan specific RFID tags based on the identification information of the interrogator 204.

The inventory management system 208 can be part of an overall oil resource planning system, some or all of which can be located within the storage tank farm in communication (for example, wireless or wireline communication) with one or more tank interrogators 204. The communication can use any suitable location technology, such as ACTIVE BAT, CRICKET, an infrared cell-of-origin system, a radio beacon, or an active/passive RFID device. The inventory management system 208 includes a resource planning module 215 that is configured to perform operations including determination of total amount of liquid per liquid type within the storage tank farm, based on data received from interrogators 204 at each given location within the storage tank farm. The resource planning module 215 can be configured to perform one or more operations, in response to determining the total amount of liquid including current and future sales planning and transactions. The one or more operations can include an operation that can affect the total amount of liquid, such as accessing one or more valves, pipes, devices, or systems leading to an increase or a decrease of the liquid stored within one or more tanks. A signal or a query associated to the one or more operations can be provided to the interrogator 204 or the inventory management system 208 for further processing.

Figure 3:
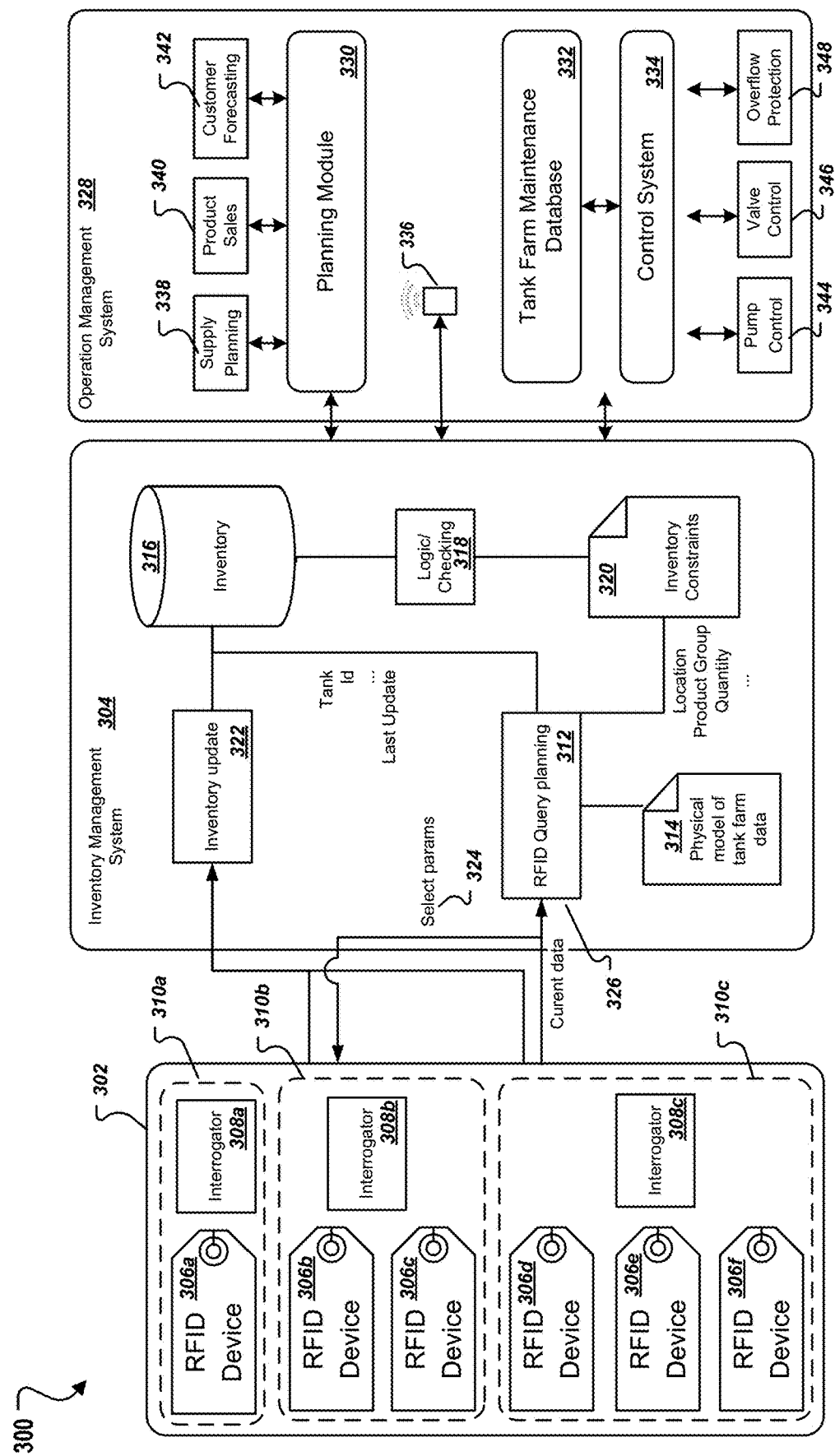
FIG. 3 is an example system, according to an implementation.

Turning to FIG. 3, FIG. 3 is a block diagram 300 of an example system for optimizing tank gauging within a tank farm. In general, FIG. 3 depicts the entities of the system 300 in a systematic way, indicating some of the entities that can contribute to more efficient registering and reading RFID data.

The system 300 includes a tank farm 302, an inventory management system 304 and an operation management system 328. The storage tank farm 302 includes RFID devices 306a, 306b, 306c, 306d, 306e, 306f and interrogators 308a, 308b, 308c. The RFID devices 306a, 306b, 306c, 306d, 306e, 306f can be similar to the RFID devices 116a, 116b, 116c, and 202 described with reference to FIGS. 1B and 2. The interrogators 308a, 308b, 308c can be operable to scan one or more RFID devices 306a, 306b, 306c, 306d, 306e, 306f that are attached to (or embedded within) respective tanks 310a, 310b, 310c in the storage tank farm 302. For example, the interrogators 308a, 308b, 308c can be similar in operation to the interrogators 114a, 114b, and 204 described with reference to FIGS. 1B and 2.

The inventory management system 304 includes an RFID query planning module 312, a physical model 314, a tank farm inventory 316, a logic checking module 318, multiple inventory constraints 320, and an inventory update module 322. The inventory management system 304 can be similar in function to the inventory management system 208 described in reference to FIG. 2. In some implementations, other components of the inventory management system 304 can exist.

The RFID planning module 312 can generate the select parameters 324 that can be provided to the interrogators 308a, 308b, 308c and can receive current data 326 from the interrogators 308a, 308b, 308c. For example, parameters 324 can allow the interrogators 308a, 308b, 308c to query only a specific population of RFID devices 306a, 306b, 306c, 306d, 306e, 306f in the storage tank farm 302. Further, other select parameters 324 can identify frame lengths to be used when querying RFID devices 306a, 306b, 306c, 306d, 306e, 306f, where, for example, the frame lengths can depend on previously measured liquid quantities or liquid types stored within the storage tanks associated with the RFID devices 306a, 306b, 306c, 306d, 306e, 306f.

Such parameters 324 can use RFID reader model information from the physical model 314, location IDs from the storage tank farm inventory 316, and inventory information from the storage tank farm inventory 316. The physical model 314 can include information describing a physical model (for example, scan settings) of the interrogators 308a, 308b, 308c. If different interrogators 308a, 308b, 308c are in use, then the physical model 314 can define physical models of each of the different interrogators 308a, 308b, 308c that can be associated to the storage tank characteristics or the characteristics of the RFID devices 306a, 306b, 306c, 306d, 306e, 306f.

The storage tank farm inventory 316 can include a complete inventory of tank associated data within the storage tank farm 302 as well as their corresponding RFID devices 306a, 306b, 306c, 306d, 306e, 306f based on current data 326. The inventory constraints 320 can include, for example, plan-o-gram compliance information, such as information that describes how multiple tank farms (for example, in the same chain) can be organized so that customers can experience the same look and feel. The system 300 can use the inventory constraints 320 to identify tanks with liquid amounts that are above or below a particular threshold. For example, if a tank stores a liquid at less than approximately 10 percent of its capacity or more than approximately 90 percent of its capacity an alert can be triggered. The system 300 can use the inventory constraints 320 to identify tanks with damaged walls. For example, the system 300 includes a camera that can proactively look for damaged walls, cracks, and even corrosion spots without taking the tank offline, thus enabling continuous tank operation. If a wall damage (for example a crack) leads to a leak, a discrepancy between inlet-outlet valve readouts can be determined and an alarm signal can be fed to a leak detection system (LDS).

The inventory update module 322 can receive tank gauging data from the interrogators 308a, 308b, 308c. The information can be based on responses received by the interrogators 308a, 308b, 308c after querying the RFID devices 306a, 306b, 306c, 306d, 306e, 306f. For example, the information can include liquid amount per tank and damage data of tanks within the storage tank farm 302. Such information can be used to update the storage tank farm inventory 316. The logic checking module 318 can be used, for example, to combine logic (for example, using plan-o-gram compliance information from the inventory constraints 320) with inventory information in order to generate selection parameters 324.

The system 300 is configured to provide "immediate" (for example, real-time) data analysis and decision making based on capacity planning, product movement and custody transfer information, thus proactive business transactions can be arranged and planned. The system 300 can provide optimizations by selective querying of specific interrogators 308*a*, 308*b*, 308*c* that are inventoried according to the current system model at a given location corresponding to a particular tank; selective sequential querying of RFID devices 306*b*, 306*c*, 306*d*, 306*e*, 306*f* for tanks 310*b*, 310*c* that include multiple RFID devices, and selection of RFID devices based on facts (for example, recorded wall damage) to predict future unavailability of a tank for liquid storage or schedule a tank repair based on camera scans and inventory information. Any and all such optimizations can lead to major tank farm management efficiencies (for example, speed-up and accuracy) from using system 300 and the method described with reference to FIG. 4A.

The operation management system includes a planning module 330, a tank farm maintenance database 332, a control system 334 and mobile devices 336. The planning module 330 is configured to communicate with a supply planning module 338, a product sale module 340 and a customer forecasting module 342. The supply planning module 338 can be configured to process data associated to plan and demand to facilitate planning of transactions based on data received from the inventory management system 304. The product sale module 340 can be configured to process data associated to planned and completed purchases associated to liquids stored within the tank farm 302. The customer forecasting module 342 can be configured to process data received from the inventory management system 304 to generate inventory forecasts for the tank farm 302.

The tank farm maintenance database 332 can be configured to store maintenance data, such as a history of maintenance protocols and results. The control system 334 can be configured to include a process control module and a tank control module. The control system 334 can be configured to communicate with a pump control module 344, a valve control module 346 and an overflow protection module 348. The process control can include scheduled operations and conditional operations. For example, the process control can generate a signal to affect the pump control module 344, such that if a tank is empty a filling pump is open. As another example, if the overflow protection module 348 identifies that a tank is full, a relief valve is open using the valve control module 346 and the filling pump is stopped using the pump control module 344.

Figure 4A:
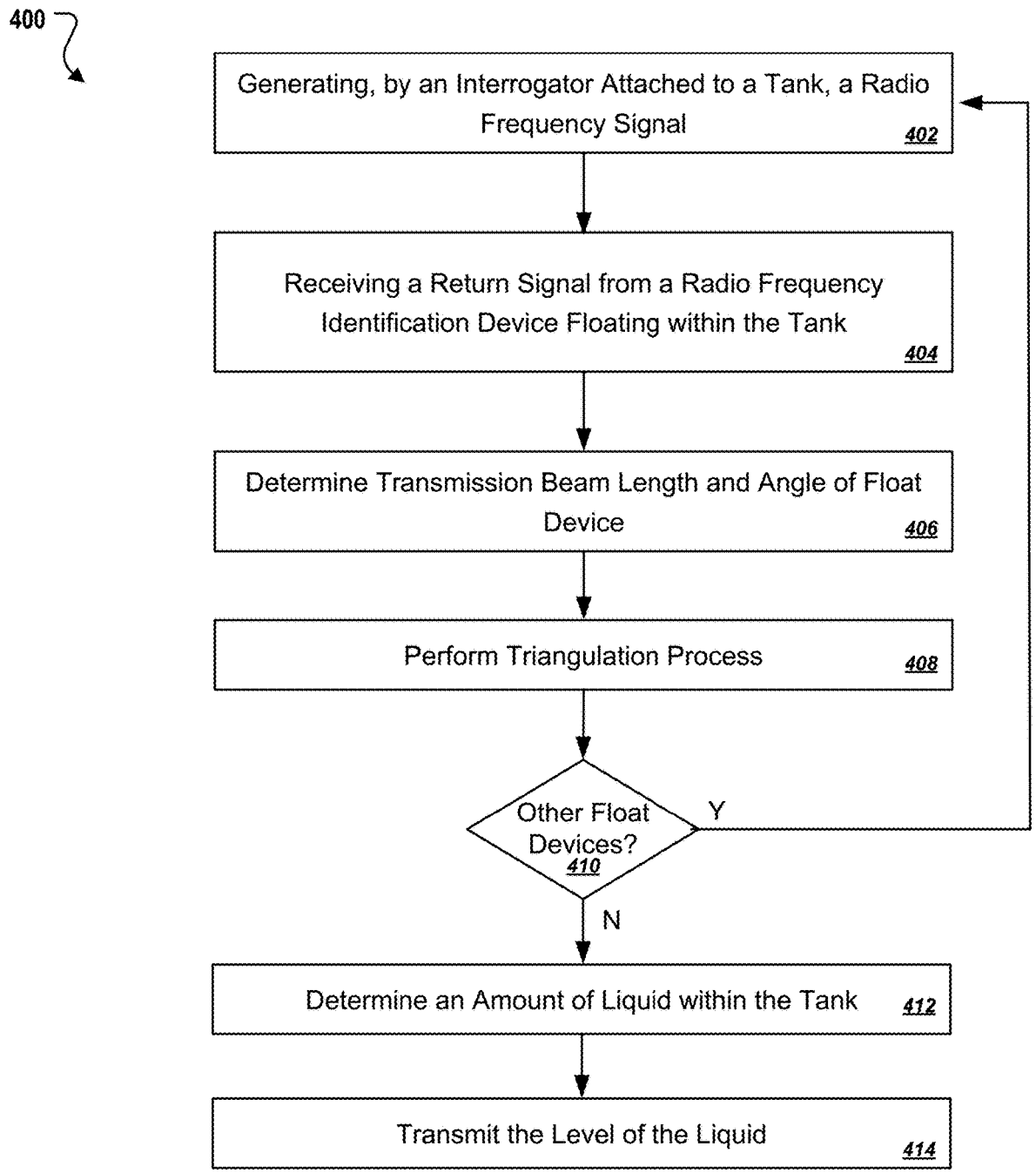
FIG. 4A is a flowchart illustrating an example method for tank gauging, according to an implementation.

Turning to FIG. 4A, FIG. 4A is a flowchart 400 illustrating a RFID triangulated tank gauging method for managing a tank farm inventory, according to an implementation. For clarity of presentation, the description that follows generally describes method 400 in the context of the other figures in this description. However, it will be understood that method 400 can be performed, for example, by any suitable system, environment, software, and hardware, or a combination of systems, environments, software, and hardware, as appropriate. In some implementations, various steps of method 400 can also be run in parallel, in combination, in loops, or in any order.

At 402, a radio frequency signal is generated by an interrogator that is attached to a tank that is configured to store a liquid. In some implementations, the radio frequency signal is generated in response to the interrogator receiving a trigger signal from an external device. The trigger signal can be generated by a user of a remote device or a sensor detecting an operation affecting an amount of a liquid within a tank. In some implementations, the radio frequency signal is generated in response to the interrogator receiving a query from an inventory management system. The query can include a selection of parameters and can request current data associated to the storage tank or the liquid stored within the storage tank. In some implementations, the radio frequency signal is generated based on a timer of the interrogator that is configured to periodically initiate method 400. The radio frequency signal is configured to be directed towards a RFID device that is freely floating within the storage tank. If multiple RFID devices are freely floating within the storage tank, the radio frequency signal can be configured to interrogate a single RFID device at a time and sequentially interrogate all RFID devices that are freely floating within the storage tank. From 402, method 400 proceeds to 404.

At 404, a return signal is received from the RFID device. The return signal can include an RF beam generated by an active RF tag and one or more additional data generated by one or more components of the RFID device. For example, the components of the RFID device include a memory storing capacity, sensor, a camera, a processor, wireless rechargeable battery, antenna wireless-HART gateway, and a propulsion system. The one or more additional data can include data measured by one or more sensors integrated within the RFID device and one or more images of a portion of the storage tank wall that can be associated to a tank wall damage, such as an erosion captured by the camera. In some implementations, the RFID device generates a plurality of return signals, each return signal corresponding to a position, to which the propulsion system moved the RFID device. From 404, method 400 proceeds to 406.

At 406, location data including a beam length (BL) and interrogator angle ($\alpha$) of the RFID device are determined by the interrogator. For example, the interrogator can be configured to include a phased array receiver configured to determine BL and angle $\alpha$ by comparing and analyzing signals arriving at multiple identical receivers with closely spaced antennas. From 406, method 400 proceeds to 408.

At 408, a triangulation algorithm is performed by the interrogator to determine the height of each RFID device, from which a return signal was received. Triangulation algorithms include determining the location of a point by forming triangles to it from known points. The triangulation algorithm uses as input the storage tank's height (TH), BL, and angle $\alpha$. TH can be extracted from a database, such as an external database or a storage medium integrated in the interrogator. The triangulation algorithm generates as output the transmission angle $\theta$, the RFID device height (DH), the liquid height (LH), and the actual liquid volume in the storage tank.

The angle $\theta$ can be determined based on a as: $\theta = 90 - \alpha$. The value of DH corresponds to the perpendicular distance between the liquid surface and top of the storage tank. DH can be determined, by applying trigonometric functions to the triangle formed by BL, the liquid surface (LS), and RH:

$$\sin\theta = \frac{DH}{BL}$$

$$\cos\theta = \frac{LS}{BL}$$

$$\tan\theta = \frac{DH}{LS}$$

For example, DH can be determined as (sin θ·BL). The value of LH can be determined by subtracting DH from TH. From 408, method 400 proceeds to 410.

At 410 it is determined whether other RFID devices, different from the ones for which the interrogator performed the triangulation process, exist within the storage tank. For tanks that include multiple RFID devices, the method proceeds to 402 and the method is repeated for each RFID device such that LH can be determined separately, based on data received from each RFID device. In some implementations, if it is determined that no additional RFID device is included in the storage tank, it is determined whether any of the existent RFID devices was moved to a different position by its propulsion system. For registered location displacement of the RFID devices, the method proceeds to 402 and the method is repeated for each registered movement.

At 410, if it is determined that LH was determined for all RFID devices within the storage tank, a final LH can be determined by averaging LH derived based on data from each RFID device at each registered location. The average of the multiple LH estimates increases the accuracy of the results. In response to determining the final LH, method 400 proceeds to 412.

At 412, the actual amount of liquid volume in the storage tank can be determined by multiplying LH by the base area of the storage tank. The base area of the storage tank can be extracted from a database, such as an external database or a storage medium integrated in the interrogator. From 412, method 400 proceeds to 414.

At 414, the result data including the actual amount of liquid volume in the storage tank and the storage tank integrity data are transmitted to an inventory management system. The result data can include an alert if the liquid amount identified within a tank is above or below a particular threshold. For example, if a tank stores a liquid at less than approximately 10 percent of its capacity or more than approximately 90 percent of its capacity an alert can be triggered. The result data can include an alert if the damaged walls identified within a tank is of a particular type or is above a particular size threshold, such as larger than 1 centimeter. The transmission of the result data can be performed over a wireless or wired network. In response to receiving the data, the inventory management system can perform one or more operations. The operations can include an operation to regulate the amount of liquid within the storage tank, such as by controlling one or more volume regulation valves, including drain valves and refill valves. The operations can include tank maintenance operations such as repairs of the damaged walls or any other tank related operations.

Figure 4B:
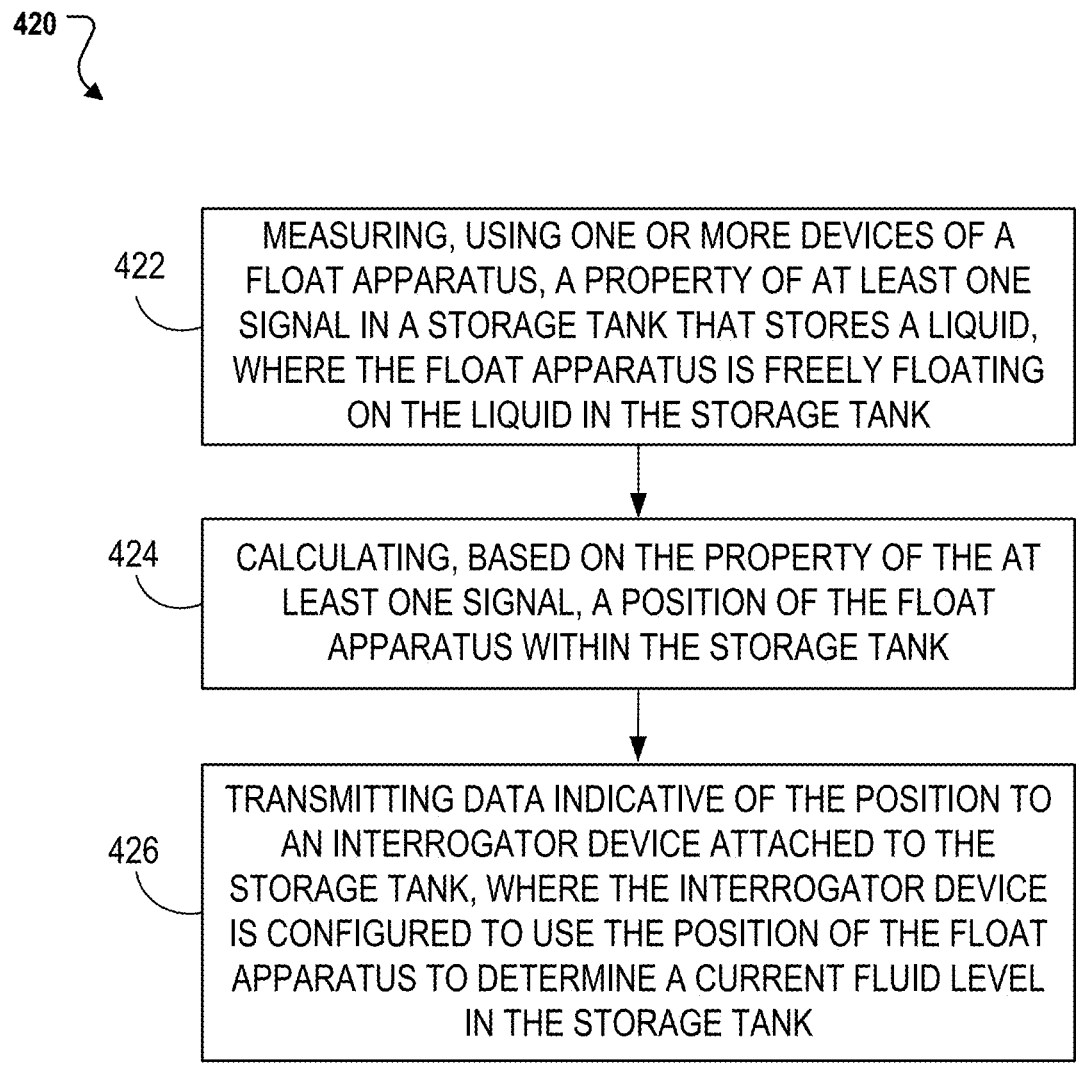
FIG. 4B is a flowchart illustrating an example method for determining a position of a float apparatus, according to an implementation.

FIG. 4B is a flowchart illustrating a method 420 for determining a position of a float apparatus, according to an implementation. For clarity of presentation, the description that follows generally describes method 420 in the context of the other figures in this description. However, it will be understood that method 420 can be performed, for example, by any suitable system, environment, software, and hardware, or a combination of systems, environments, software, and hardware, as appropriate. In some implementations, various steps of method 420 can also be run in parallel, in combination, in loops, or in any order.

At step 422, the method 420 involves measuring, using one or more devices of a float apparatus, a property of at least one signal in a storage tank that stores a liquid, where the float apparatus is freely floating on the liquid in the storage tank. In an example, the float apparatus may be the float apparatus 140 of FIG. 1A and RFID devices 116a, 116b, 116c. Further, the one or more devices of the float apparatus may include one or more of the components shown in FIG. 1A and FIG. 2.

At step 424, the method 420 involves calculating, based on the property of the at least one signal, a position of the float apparatus within the storage tank. In an example, the position of the float apparatus is a float apparatus position on a horizontal plane, perhaps as an offset angle (θ) from a center of the tank. In another example, the float apparatus position is an inclined distance between the float apparatus and a specific point in the tank. In yet another example, the float apparatus position is a two-dimensional float apparatus position within the storage tank.

At step 426, the method 420 involves transmitting data indicative of the position to an interrogator device attached to the storage tank, where the interrogator device is configured to use the position of the float apparatus to determine a current fluid level in the storage tank. In an example, the interrogator device uses a triangulation algorithm to calculate the fluid level in the storage tank.

In an implementation, the one or more devices include a plurality of optical sensors, where the at least one signal includes an optical signal reflected by or emitted from an optical target within the storage tank, where the property of the at least one signal is a strength of the at least one signal, and where the position of the float apparatus within the storage tank includes a vertical distance between the float apparatus and a top area of the storage tank.

In an implementation, the float apparatus further includes a light source that illuminates the optical target, and where the optical signal is a reflection of an illumination from the light source.

In an implementation, the optical target includes a light source that emits the optical signal.

In an implementation, the float apparatus further includes a light source that emits an intensity modulated light toward a reflective target within the storage tank, where the at least one signal includes an optical signal reflected from the reflective target, where the one or more devices include an optical sensor, where the property of the at least one signal is a difference in phase between the intensity modulated light and the optical signal, and where the position of the float apparatus within the storage tank includes a distance between the float apparatus and the reflective target.

In an implementation, the one or more devices include a vibration sensor, where the at least one signal includes a vibration signal, and where the property of the at least one signal is a frequency of the vibration signal.

In an implementation, a source of the vibration signal is at least one of a standalone vibration source in the storage tank or a propulsion engine of the float apparatus.

In an implementation, the one or more devices include a wireless charging receiver, where the at least one signal is a wireless power signal, and where the property of the at least one signal is a power transfer efficiency.

In an implementation, the float apparatus uses the float positioning information as to program custom propulsion plans for activities such as, routine structure inspection and to commence wireless charging.

In an implementation, the information provided by the float apparatus can be used to enable digital transformation processes by facilitating dashboarding, advanced data analytics, and artificial intelligence capabilities.

In an implementation, the one or more devices further gather data indicative of digital transformation information, wherein the digital transformation information is used for prediction and decision making in proactive control schemes. Digital transformation technologies provide embedded information capabilities so that when correlated (for example, using advanced analytics), it can provide intelligent prediction and decision making that can be used for proactive control, which is not otherwise provided by conventional fluid level technologies. For example, trends that use time stamps of filling/discharging tanks can be generated, where the trends can be used to derive information indicative of pipeline capacity, customer consumption rates, and the associated financial impact. The trends based on maintenance records archives can be used to trigger a requirement to upgrade or replace a tank (for example, if a tank required four maintenance jobs in the last six months).

In an implementation, the float apparatus further includes an image sensor configured to capture an image of a target within the storage tank, and where the method further includes calculating, based on the captured image, a distance between the image sensor and the target.

In an implementation, calculating, based on the image, the distance between the image sensor and the target uses the equation:

$$f = \frac{(p \times d)}{w},$$

where f is a focal length of the image sensor, p is an apparent width in pixels, and d is a distance between the image sensor and the target.

Figure 5:
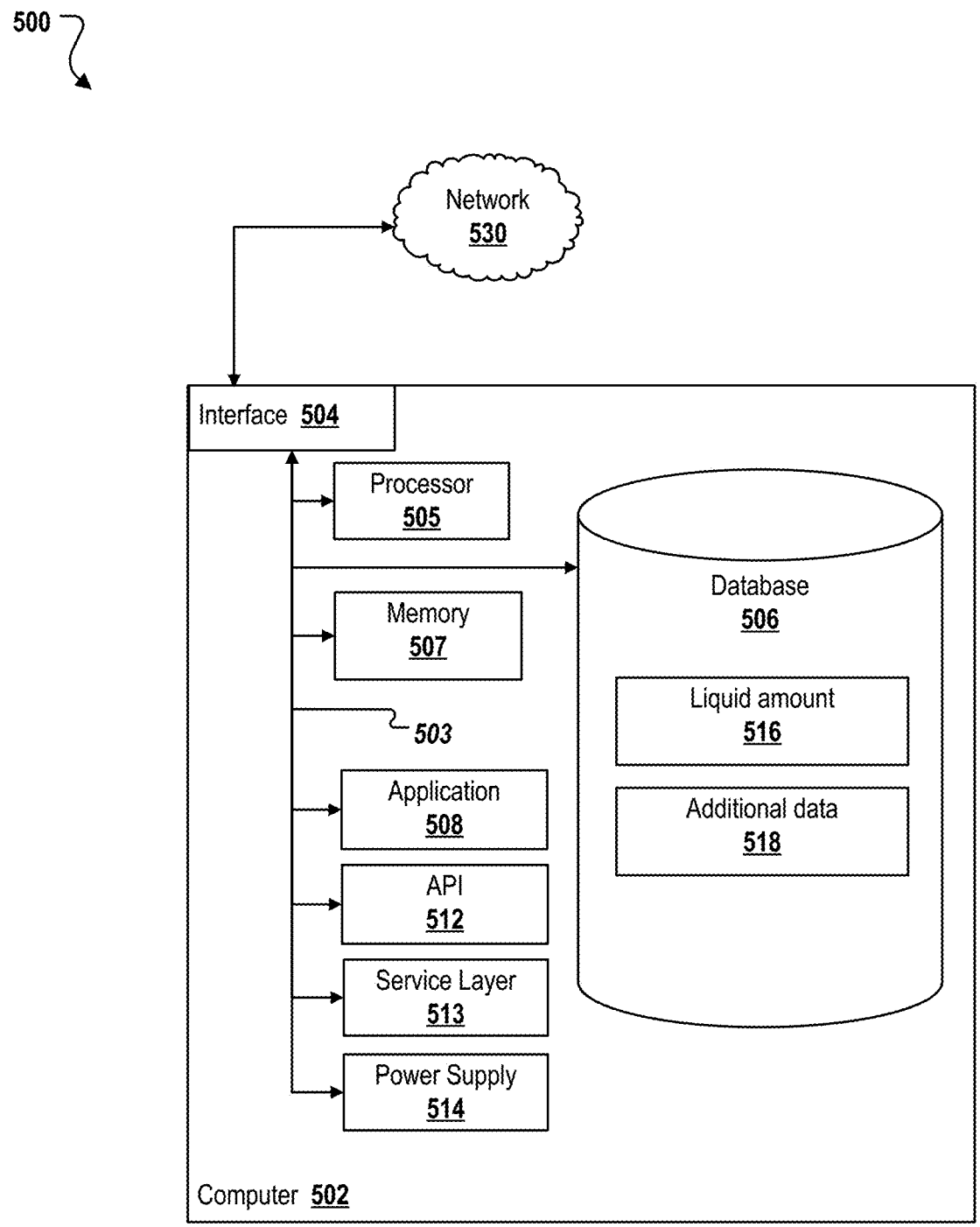
FIG. 5 is a block diagram illustrating an example computer system used to provide computational functionalities associated with described algorithms, methods, functions, processes, flows, and procedures as described in the instant disclosure, according to an implementation.

FIG. 5 is a block diagram of an example computer system 500 used to provide computational functionalities associated with described algorithms, methods, functions, processes, flows, and procedures, as described in the instant disclosure, according to an implementation. The illustrated computer 502 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 502 can comprise a computer that includes an input device, such as a keypad, keyboard, touch screen, or other device that can accept user information, and an output device that conveys information associated with the operation of the computer 502, including digital data, visual, or audio information (or a combination of information), or a graphical user interface (GUI).

The computer 502 can serve in a role as a client, network component, a server, a database or other persistency, or any other component (or a combination of roles) of a computer system for performing the subject matter described in the instant disclosure. The illustrated computer 502 is communicably coupled with a network 530. In some implementations, one or more components of the computer 502 can be configured to operate within environments, including cloud-computing-based, local, global, or other environment (or a combination of environments).

At a high level, the computer 502 is an electronic computing device operable to receive, transmit, process, store, or manage data and information associated with the described subject matter. According to some implementations, the computer 502 can also include, or be communicably coupled with, an application server, e-mail server, web server, caching server, streaming data server, or other server (or a combination of servers).

The computer 502 can receive requests over network 530 from a client application (for example, executing on another computer 502) and respond to the received requests by processing the received requests using an appropriate software application(s). In addition, requests can also be sent to the computer 502 from internal users (for example, from a command console or by other appropriate access method), external or third-parties, other automated applications, as well as any other appropriate entities, individuals, systems, or computers.

Each of the components of the computer 502 can communicate using a system bus 503. In some implementations, any or all of the components of the computer 502, hardware or software (or a combination of both hardware and software), can interface with each other or the interface 504 (or a combination of both), over the system bus 503 using an application programming interface (API) 512 or a service layer 513 (or a combination of the API 512 and service layer 513). The API 512 can include specifications for routines, data structures, and object classes. The API 512 can be either computer-language independent or dependent and refer to a complete interface, a single function, or even a set of APIs. The service layer 513 provides software services to the computer 502 or other components (whether or not illustrated) that are communicably coupled to the computer 502. The functionality of the computer 502 can be accessible for all service consumers using this service layer. Software services, such as those provided by the service layer 513, provide reusable, defined functionalities through a defined interface. For example, the interface can be software written in JAVA, C++, or other suitable language providing data in extensible markup language (XML) format or other suitable format. While illustrated as an integrated component of the computer 502, alternative implementations can illustrate the API 512 or the service layer 513 as stand-alone components in relation to other components of the computer 502 or other components (whether or not illustrated) that are communicably coupled to the computer 502. Moreover, any or all parts of the API 512 or the service layer 513 can be implemented as child or sub-modules of another software module, enterprise application, or hardware module without departing from the scope of this disclosure.

The computer 502 includes an interface 504. Although illustrated as a single interface 504 in FIG. 5, two or more interfaces 504 can be used according to particular needs, desires, or particular implementations of the computer 502. The interface 504 is used by the computer 502 for communicating with other systems that are connected to the network 530 (whether illustrated or not) in a distributed environment. Generally, the interface 504 comprises logic encoded in software or hardware (or a combination of software and hardware) and is operable to communicate with the network 530. More specifically, the interface 504 can comprise software supporting one or more communication protocols associated with communications such that the network 530 or interface's hardware is operable to communicate physical signals within and outside of the illustrated computer 502.

The computer 502 includes a processor 505. Although illustrated as a single processor 505 in FIG. 5, two or more processors can be used according to particular needs, desires, or particular implementations of the computer 502. Generally, the processor 505 executes instructions and manipulates data to perform the operations of the computer 502 and any algorithms, methods, functions, processes, flows, and procedures as described in the instant disclosure.

The computer 502 also includes a database 506 that can hold data for the computer 502 or other components (or a combination of both) that can be connected to the network 530 (whether illustrated or not). For example, database 506 can be an in-memory, conventional, or other type of database storing data consistent with this disclosure. In some implementations, database 506 can be a combination of two or more different database types (for example, a hybrid in-memory and conventional database) according to particular needs, desires, or particular implementations of the computer 502 and the described functionality. Although illustrated as a single database 506 in FIG. 5, two or more databases (of the same or combination of types) can be used according to particular needs, desires, or particular implementations of the computer 502 and the described functionality. While database 506 is illustrated as an integral component of the computer 502, in alternative implementations, database 506 can be external to the computer 502. As illustrated, the database 506 holds previously described Liquid amount 516 and Additional data 518 (for example, including sensor data and tank wall images).

The computer 502 also includes a memory 507 that can hold data for the computer 502 or other components (or a combination of both) that can be connected to the network 530 (whether illustrated or not). For example, memory 507 can be random access memory (RAM), read-only memory (ROM), optical, magnetic, and the like, storing data consistent with this disclosure. In some implementations, memory 507 can be a combination of two or more different types of memory (for example, a combination of RAM and magnetic storage) according to particular needs, desires, or particular implementations of the computer 502 and the described functionality. Although illustrated as a single memory 507 in FIG. 5, two or more memories 507 (of the same or combination of types) can be used according to particular needs, desires, or particular implementations of the computer 502 and the described functionality. While memory 507 is illustrated as an integral component of the computer 502, in alternative implementations, memory 507 can be external to the computer 502.

The application 508 is an algorithmic software engine providing functionality according to particular needs, desires, or particular implementations of the computer 502, particularly with respect to functionality described in this disclosure. For example, application 508 can serve as one or more components, modules, or applications. Further, although illustrated as a single application 508, the application 508 can be implemented as multiple applications 508 on the computer 502. In addition, although illustrated as integral to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion or management circuits (including recharging, standby, or other power management functionality). In some implementations, the power-supply 514 can include a power plug to allow the computer 502 to be plugged into a wall socket or other power source to, for example, power the computer 502 or recharge a rechargeable battery.

There can be any number of computers 502 associated with, or external to, a computer system containing computer 502, each computer 502 communicating over network 530. Further, the term "client," "user," and other appropriate terminology can be used interchangeably, as appropriate, without departing from the scope of this disclosure. Moreover, this disclosure contemplates that many users can use one computer 502, or that one user can use multiple computers 502.

Described implementations of the subject matter can include one or more features, alone or in combination. For example, in a first implementation, a computer-implemented method includes: generating, using an interrogator, a radio frequency signal, the interrogator being attached to a top of a tank that is configured to store a liquid and the radio frequency signal being directed towards a radio frequency identification (RFID) device that is freely floating on the liquid stored within the tank, receiving a return signal from the RFID device, the return signal being associated to a location of the RFID device, processing, by one or more processors integrated in the interrogator, the return signal to determine a height of the liquid stored within the storage tank based on a triangulation algorithm, and determining, by the one or more processors, a result data based on the height of the liquid stored within the storage tank and one or more tank characteristics. In another implementation, a non-transitory, computer-readable medium stores one or more instructions executable by a computer system to perform operations including: generating, using an interrogator, a radio frequency signal, the interrogator being attached to a top of a tank that is configured to store a liquid and the radio frequency signal being directed towards a radio frequency identification (RFID) device that is freely floating on the liquid stored within the tank, receiving a return signal from the RFID device, the return signal being associated to a location of the RFID device, processing, by one or more processors integrated in the interrogator, the return signal to determine a height of the liquid stored within the storage tank based on a triangulation algorithm, and determining, by the one or more processors, a result data based on the height of the liquid stored within the storage tank and one or more tank characteristics. In another implementation, a computer-implemented system includes: a tank configured to store a liquid, a radio frequency identification (RFID) device freely floating on the liquid stored within the storage tank, an interrogator attached to a top of the storage tank, the interrogator including a computer memory and a hardware processor interoperably coupled with the computer memory and configured to perform operations including: generating a radio frequency signal directed towards the RFID device, receiving a return signal from the RFID device, the return signal being associated to a location of the RFID device, processing the return signal to determine a height of the liquid stored within the storage tank based on a triangulation algorithm, and determining a result data based on the height of the liquid stored within the storage tank and one or more tank characteristics.

The foregoing and other described implementations can each, optionally, include one or more of the following features:

A first feature, combinable with any general implementation, the result data is transmitted to an inventory management system. In a second feature, combinable with any of the previous or following features, the radio frequency signal is generated in response to receiving a trigger signal. In a third feature, combinable with any of the previous or following features, the return signal includes a beam length and an angle associated to the RFID device. In a fourth feature, combinable with any of the previous or following features, the result data includes an amount of the liquid stored within the tank. A fifth feature, combinable with any of the previous or following features, includes, in response to determining the result data, opening a valve attached to the tank to modify the amount of the liquid stored within the tank. In a sixth feature, combinable with any of the previous or following features, the RFID device includes a camera configured to take images of an inner wall of the tank. In a seventh feature, combinable with any of the previous or following features, processing the return signal includes performing an image processing algorithm of the images of the inner wall of the tank. In an eight feature, combinable with any of the previous or following features, the RFID device includes a propulsion system configured to move the RFID device between different positions.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond, less than 1 second, or less than 5 seconds. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include, special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which can also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs can instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory can store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory can include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network can communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
  measuring, using one or more devices of a float apparatus, a property of at least one signal in a storage tank that stores a liquid, wherein the float apparatus is freely floating on the liquid in the storage tank;
  calculating, based on the property of the at least one signal, a position of the float apparatus within the storage tank;
  transmitting data indicative of the position to an interrogator device attached to the storage tank, wherein the interrogator device is configured to use the position of the float apparatus to determine a current fluid level in the storage tank; and
  generating, based on the position of the float apparatus, a propulsion plan for the float apparatus, wherein the propulsion plan comprises a starting position within the tank, a destination within the tank, and at least one path between the starting position and the destination.

2. The computer-implemented method of claim 1, wherein the one or more devices comprise a plurality of optical sensors, wherein the at least one signal comprises an optical signal reflected by or emitted from an optical target within the storage tank, wherein the property of the at least one signal is a strength of the at least one signal, and wherein the position of the float apparatus within the storage tank comprises a vertical distance between the float apparatus and a top area of the storage tank.

3. The computer-implemented method of claim 2, wherein the float apparatus further comprises a light source that illuminates the optical target, and wherein the optical signal is a reflection of an illumination from the light source.

4. The computer-implemented method of claim 2, wherein the optical target comprises a light source that emits the optical signal.

5. The computer-implemented method of claim 1, wherein the float apparatus further comprises a light source that emits an intensity modulated light toward a reflective target within the storage tank, wherein the at least one signal comprises an optical signal reflected from the reflective target, wherein the one or more devices comprise an optical sensor, wherein the property of the at least one signal is a difference in phase between the intensity modulated light and the optical signal, and wherein the position of the float apparatus within the storage tank comprises a distance between the float apparatus and the reflective target.

6. The computer-implemented method of claim 1, wherein the one or more devices comprise a vibration sensor, wherein the at least one signal comprises a vibration signal, and wherein the property of the at least one signal is a frequency of the vibration signal.

7. The computer-implemented method of claim 6, wherein a source of the vibration signal is at least one of a standalone vibration source in the storage tank or a propulsion engine of the float apparatus.

8. The computer-implemented method of claim 1, wherein the one or more devices comprise a wireless charging receiver, wherein the at least one signal is a wireless power signal, and wherein the property of the at least one signal is a power transfer efficiency.

9. The computer-implemented method of claim 1, wherein the float apparatus further comprises an image sensor configured to capture an image of a target within the storage tank, and wherein the method further comprises:
  calculating, based on the captured image, a distance between the image sensor and the target.

10. The computer-implemented method of claim 1, wherein the one or more devices further gather data indicative of digital transformation information, wherein the digital transformation information is used for prediction and decision making in proactive control schemes.

11. A non-transitory, computer-readable medium storing one or more instructions executable by a computer system to perform operations comprising:
  causing an image sensor of a float apparatus to capture at least one image of a target within a storage tank, wherein the float apparatus is freely floating on a liquid in the storage tank;
  calculating, based on the at least one captured image, a distance between the image sensor and the target;
  calculating, based on the distance, a position of the float apparatus within the storage tank; and
  transmitting data indicative of the position to an interrogator device attached to the storage tank, wherein the interrogator device is configured to use the position of the float apparatus to determine a current fluid level in the storage tank.

12. The non-transitory, computer-readable medium of claim 11, wherein the at least one capture image comprises a plurality of images, and wherein calculating, based on the at least one captured image, the distance comprises:
  calculating, based on each of the plurality of images, a respective distance associated with the image; and
  calculating the distance as an accumulative average of the respective distances.

13. A float apparatus comprising:
  a first sensor positioned at a first end of the float apparatus;
  a second sensor positioned at a second end of the float apparatus opposite the first end;
  one or more processors; and
  a non-transitory computer-readable storage medium coupled to the one or more processors and storing programming instructions for execution by the one or more processors, the programming instructions instructing the one or more processors to perform operations comprising:
    measuring, using the first sensor and the second sensor, a property of at least one signal in a storage tank that stores a liquid, wherein the float apparatus is freely floating on the liquid in the storage tank;
    calculating, based on the property of the at least one signal, a position of the float apparatus within the storage tank; and
    transmitting data indicative of the position to an interrogator device attached to the storage tank, wherein the interrogator device is configured to use the position of the float apparatus to determine a current fluid level in the storage tank.

14. The float apparatus of claim 13, wherein the first sensor and the second sensor are optical sensors, wherein the at least one signal comprises an optical signal reflected by or emitted from an optical target within the storage tank, wherein the property of the at least one signal is a strength of the at least one signal, and wherein the position of the float apparatus within the storage tank comprises a vertical distance between the float apparatus and a top area of the storage tank.

15. The float apparatus of claim 14, wherein the float apparatus further comprises a light source that illuminates the optical target, and wherein the optical signal is a reflection of an illumination from the light source.

16. The float apparatus of claim 14, wherein the optical target comprises a light source that emits the optical signal.

17. The float apparatus of claim 13, wherein the float apparatus further comprises a light source that emits an intensity modulated light toward a reflective target within the storage tank, wherein the at least one signal comprises an optical signal reflected from the reflective target, wherein the one or more devices comprise an optical sensor, wherein the property of the at least one signal is a difference in phase between the intensity modulated light and the optical signal, and wherein the position of the float apparatus within the storage tank comprises a distance between the float apparatus and the reflective target.

18. The float apparatus of claim 13, wherein the one or more devices comprise a vibration sensor, wherein the at least one signal comprises a vibration signal, and wherein the property of the at least one signal is a frequency of the vibration signal.

* * * * *